US006915340B2

(12) United States Patent
Tanaka

(10) Patent No.: US 6,915,340 B2
(45) Date of Patent: Jul. 5, 2005

(54) SYSTEM AND METHOD FOR DERIVING FUTURE NETWORK CONFIGURATION DATA FROM THE CURRENT AND PREVIOUS NETWORK CONFIGURATION DATA

(75) Inventor: Katsuyuki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 771 days.

(21) Appl. No.: 09/840,961

(22) Filed: Apr. 25, 2001

(65) Prior Publication Data

US 2002/0035625 A1 Mar. 21, 2002

(30) Foreign Application Priority Data

Apr. 27, 2000 (JP) ........................................ 2000-128425

(51) Int. Cl.[7] ............................................. G06F 15/177
(52) U.S. Cl. ......................... 709/220; 709/223; 707/10; 370/254; 370/352
(58) Field of Search ................................ 709/220–229, 709/213; 707/10, 204; 370/254, 352–354; 715/511

(56) References Cited

U.S. PATENT DOCUMENTS

| 6,115,738 | A | * | 9/2000 | Yamaguchi et al. | ........ 709/213 |
| 6,216,140 | B1 | * | 4/2001 | Kramer | ........ 715/511 |
| 6,282,175 | B1 | * | 8/2001 | Steele et al. | ................ 370/254 |
| 6,308,174 | B1 | * | 10/2001 | Hayball et al. | ................ 707/10 |
| 6,539,425 | B1 | * | 3/2003 | Stevens et al. | ............. 709/220 |
| 6,587,456 | B1 | * | 7/2003 | Rao et al. | ................... 370/352 |
| 2002/0107877 | A1 | * | 8/2002 | Whiting et al. | ............. 707/204 |

FOREIGN PATENT DOCUMENTS

| JP | 3-204067 | 9/1991 |
| JP | 4-38548 | 2/1992 |
| JP | 9-55794 | 2/1997 |
| JP | 11-252074 | 9/1999 |
| JP | 2000-3347 | 1/2000 |

* cited by examiner

Primary Examiner—Wen-Tai Lin
(74) Attorney, Agent, or Firm—Foley & Lardner LLP

(57) ABSTRACT

An apparatus and method allows current network configuration information and future network configuration information to be stored, wherein the future network configuration information reflects the future facilities planning considerations and may be dirived from the current network configuration information. The system includes a directory server on which a current map tree, containing current network configuration information and a temporary map tree are stored. The temporary map tree only contains the information for any components, organized into a tree structure, for which the configuration changes are expected to occur in the future. The system responds to a request for network configuration information that is applicable to any future time from any external resquester, and searches the trees including the directory entries that reside in the current map tree and temporary map tree.

29 Claims, 19 Drawing Sheets

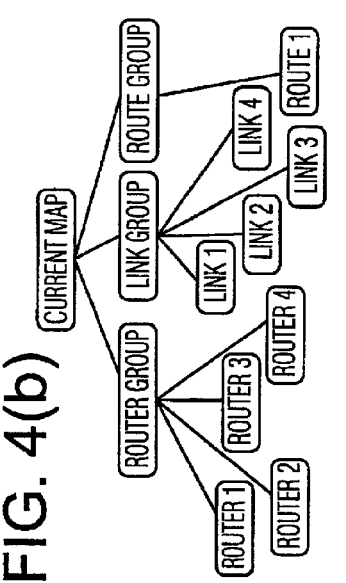
FIG. 4(a)
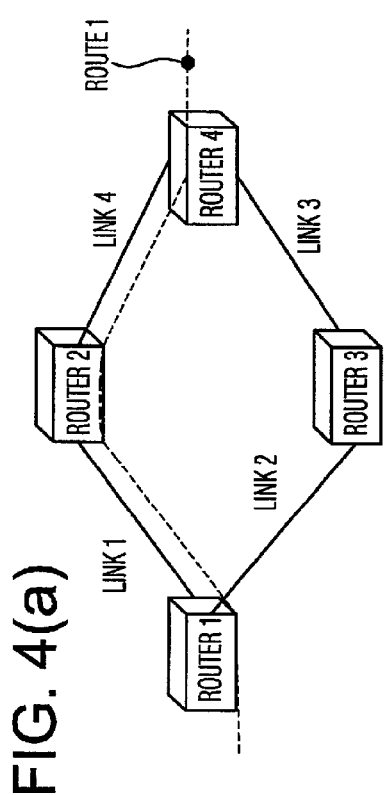
FIG. 4(c)
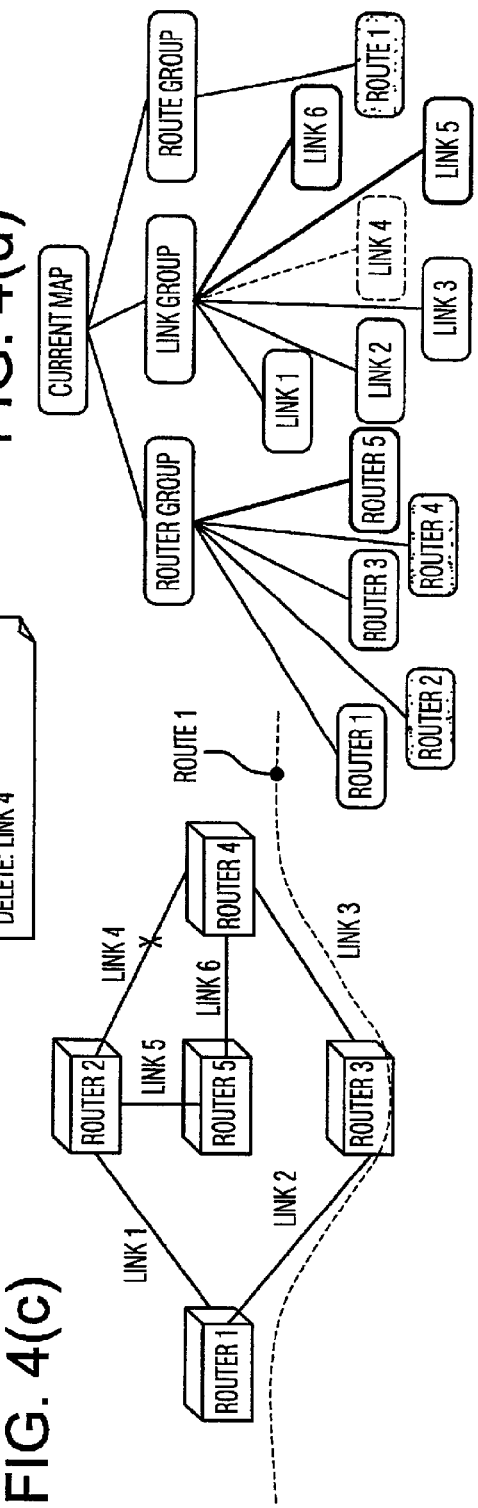
FIG. 4(b)
FIG. 4(d)
- DATA IN CONFIGURATION CHANGE REQUEST -
ADD: ROUTER 5, LINK 5, LINK 6
MODIFY: ROUTE 1, ROUTER 2, ROUTER 4
DELETE: LINK 4

FIG. 5

| | |
|---|---|
| ADD: | IDENTIFIER= {ROUTER NAME=ROUTER 5, GROUP NAME=ROUTERGROUP, MAP NAME=TEMPORARY MAP 1 } ROUTER NAME=ROUTER 5<br>　param1=abc<br>　param2=123 |
| ADD: | IDENTIFIER= {LINK NAME=LINK 5, GROUP NAME=LINKGROUP, MAP NAME=TEMPORARY MAP 1 } LINK NAME=LINK 5<br>　param3=xyz<br>　param4=111 |
| ADD: | IDENTIFIER= {LINK NAME=LINK 6, GROUP NAME=LINKGROUP, MAP NAME=TEMPORARY MAP 1 } LINK NAME=LINK 6<br>　param3=yyy<br>　param4=789 |
| MODIFY: | IDENTIFIER= {ROUTE NAME=ROUTE 1, GROUP NAME=ROUTEGROUP, MAP NAME=TEMPORARY MAP 1 } ROUTE NAME=ROUTE 1<br>　param5=ABCDE |
| MODIFY: | IDENTIFIER= {ROUTER NAME=ROUTER 2, GROUP NAME=ROUTERGROUP, MAP NAME=TEMPORARY MAP 1 } ROUTER NAME=ROUTER 2<br>　param1=bbb<br>　param2=345 |
| MODIFY: | IDENTIFIER= {ROUTER NAME=ROUTER 4, GROUP NAME=ROUTERGROUP, MAP NAME=TEMPORARY MAP 1 } ROUTER NAME=ROUTER 4<br>　param1=ccc<br>　param2=111 |
| DELETE: | IDENTIFIER= {LINK NAME=LINK 4, GROUP NAME=LINKGROUP, MAP NAME=TEMPORARY MAP 1 } |

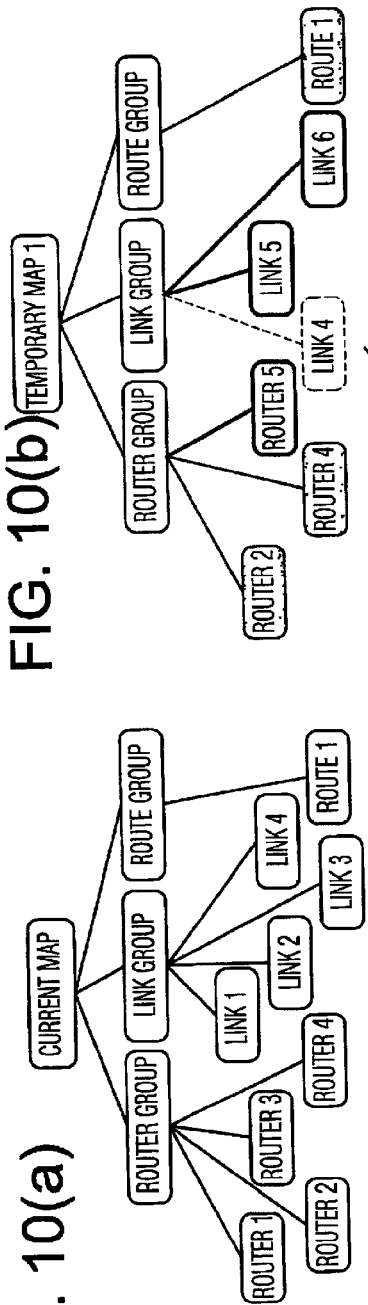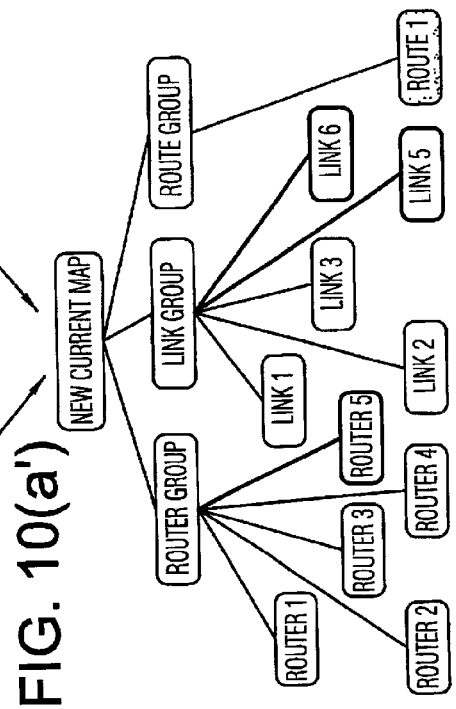
FIG. 10(a)
FIG. 10(b)
FIG. 10(a')

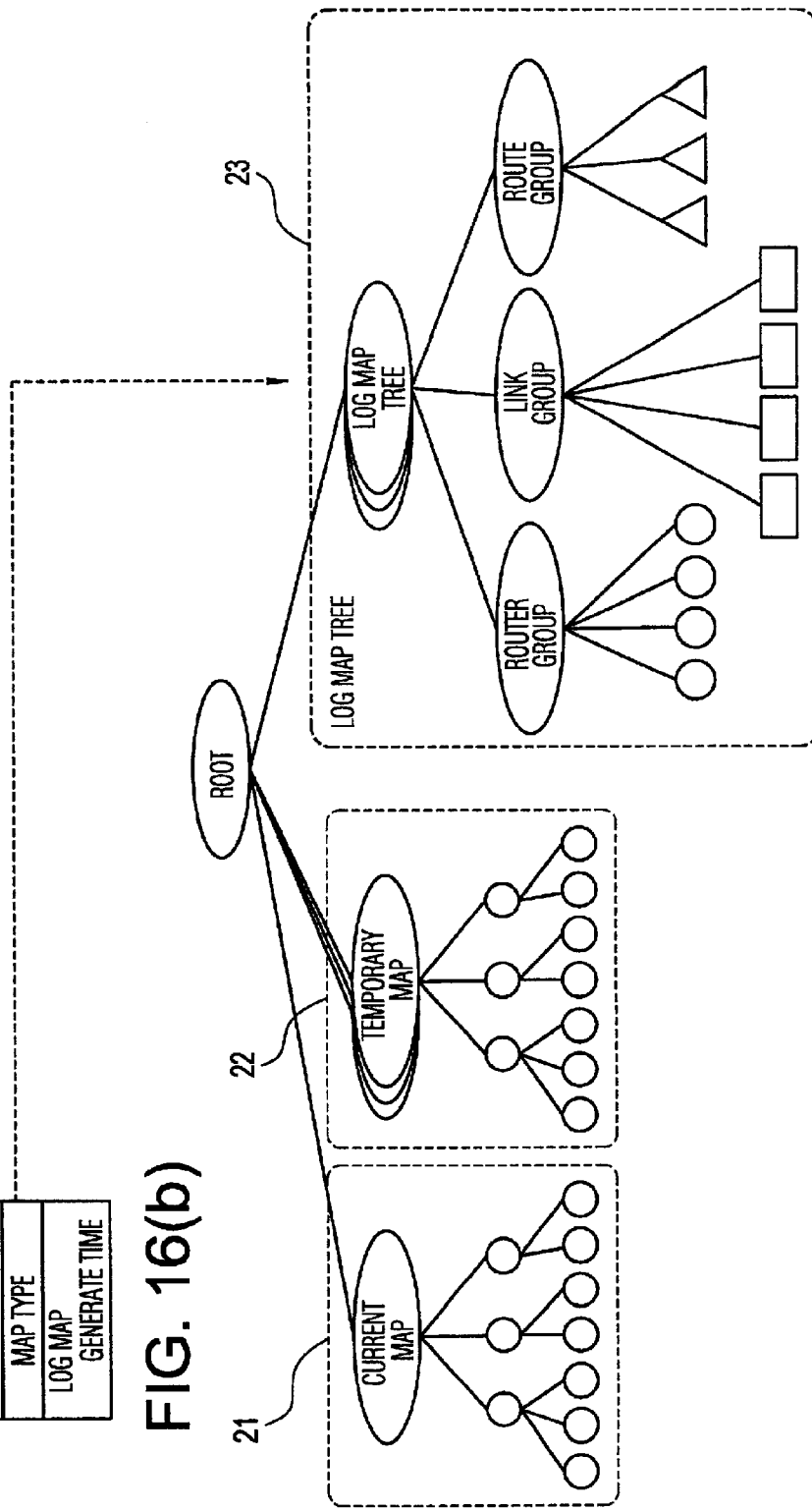

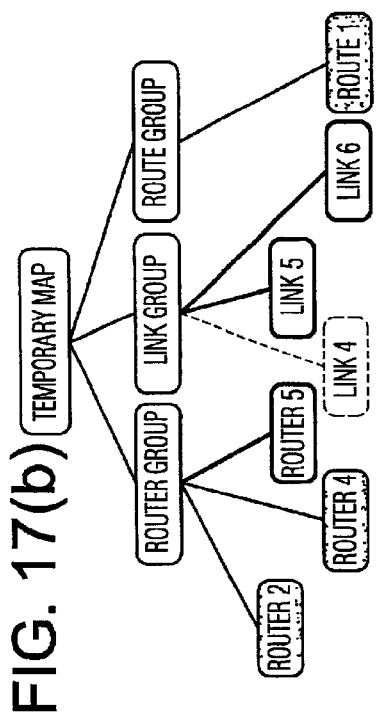
FIG. 17(a)
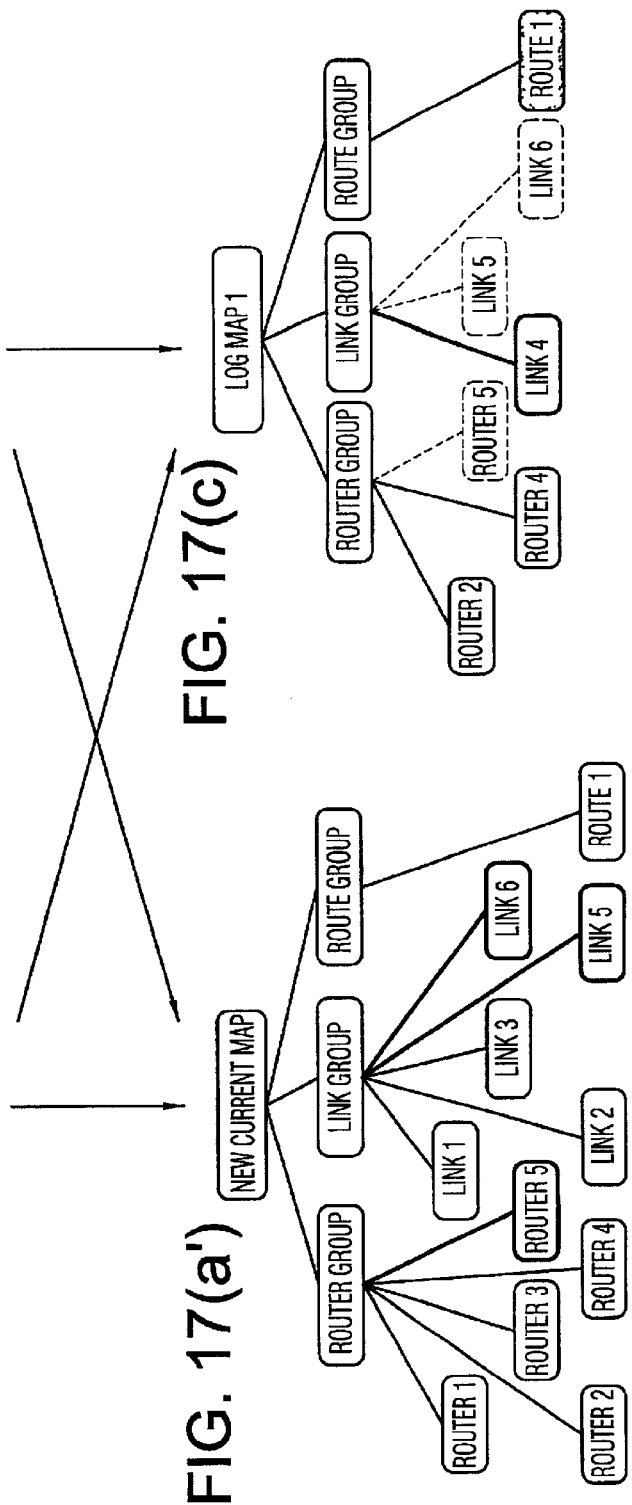
FIG. 17(b)
FIG. 17(c)
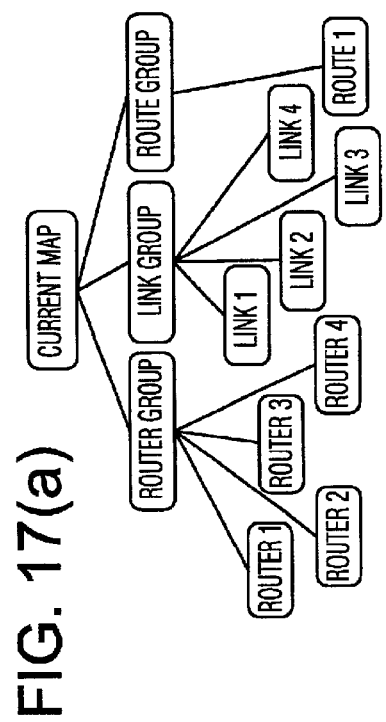
FIG. 17(a')

SYSTEM AND METHOD FOR DERIVING FUTURE NETWORK CONFIGURATION DATA FROM THE CURRENT AND PREVIOUS NETWORK CONFIGURATION DATA

FIELD OF THE INVENTION

The present invention relates to the network management technology, and more particularly to a system and method for managing the network configuration data, as well as a computer program for same.

BACKGROUND OF THE INVENTION

Generally, the network configuration data management system provides the facilities for managing the network information for network components composing the network, such as physical or logical devices and links interconnecting the devices.

The configuration data that is managed by the network configuration data management system may be referenced when additional network facilities are installed to meet the needs of users utilizing the network or the existing routes through the network are changed.

In order to respond to the demands for various network services from the users, it is desirable that network service providers should plan for the network operation in order to accommodate any network components such as devices that are expected to be added, and to allow the optimum routes to be established.

One example of the conventional network configuration management system is described in Japanese Patent Kokai Publication JP-A-H3 (1991)-204067, for example, which proposes a network configuration management method implemented by a computer program that allows the physical relationships among the adjacent devices and routes configured in the network to be mapped onto the main memory, thereby allowing the network configuration information to be referenced and updated by using the logical address calculation.

In the conventional network configuration management method mentioned above, the physical relationships among the network components, such as the network devices, the routes between the stations or nodes and the connections between the devices, cables and power supplies, that are included in the current network configuration, as well as the logical relationships among the communication lines connecting the terminals, may be recorded on the memory in a mapping table format.

SUMMARY OF THE DISCLOSURE

It should be noted, however, that the conventional network management system has several problems that are described below.

The first problem is that it only allows the current configuration information to be stored. That is, it does not accommodate any additional network devices that may be included in the future network configuration. Thus, the information for such devices and the information for links that represent the connections among such devices cannot be pre-stored previously.

The reason is that the configuration information is stored in the flat data storage structure in the table form, which is not designed to keep track of the current network configuration.

The second problem is that more resources such as storage medium may be consumed if any possible future network configuration information as well is to be stored.

The reason is that a copy of the current network configuration information is made, and is then edited to reflect all possible future network configuration information. Then, the copy is stored on the storage medium separately from the original (current) network configuration information.

The present invention is based on the recognition of the problems described above, and it is therefore an object of the present invention to provide a system for managing the network components, such as devices including routers and switches, and more specifically to provide a system and method in such system that can accommodate not only the current network configuration information, but also the future network configuration information for those network components that will be considered in the future facilities installation planning. The future network configuration information is based on the current configuration information. The present invention also provides computer programs for performing such functions, that may be stored, e.g., on a recording medium.

It is another object of the present invention to provide a system and method wherein any possible changes in the network configuration that are expected to occur at any future time later than the current time may be stored and retrieved, and to provide computer programs for performing such functions, that may be stored, e.g., on a storage medium.

It is a further object of the present invention to provide a system and method wherein any past configuration information now stored can be retrieved by tracing it back to a particular time in the past, beginning with the current configuration information, and any errors in setting the values can be restored to the original values, and is to provide computer programs for performing such functions. Other aspects, objects, advantages, and features of the present invention will readily become apparent to any person skilled in the relevant art by reading the description of the embodiments thereof that follows.

According to a first aspect of the present invention, there is provided a network configuration data management system comprising; storage means for storing a current map that represents the current network configuration information organized into a hierarchical structure and a temporary map that contains the information for components for which the configuration changes are expected to occur in the future and/or occurred in the past, and means for generating the network configuration information that is applicable to any particular time later than the current time and/or to any particular time earlier than the current time, by merging the information in the current map together with the information in the temporary map. It may be understood from the following description of the embodiments that the features of the present invention may also be implemented as claimed in the appended claims.

Specifically, there is provided a network configuration data management system comprising:

storage means for providing storage management facilities, the storage means storing: a current map for containing information represented as a current network configuration information, and a temporary map for containing information for the network components for which the configuration changes are expected to occur at any future time and/or information for network components for which the configuration changes occurred at any past time; and means for generating network configuration information that is applicable to any time relative to a particular time later than the current time and/or relative to a particular time earlier than the current time, based on the information in said current map and the information in the temporary map.

According to a second aspect, there is provided a network configuration data management system comprising:

(a) a directory server storing: a current map tree for containing current network configuration information organised into a tree structure, and a temporary map tree for only containing information for network components organised into a tree structure and for which configuration changes are expected to occur at any future time;

(b) means responsive to a request for a network configuration information applicable to any future time from an external requester, for issuing a request to access the current map tree and the temporary map tree stored in the directory server in order to search for appropriate trees containing directory entries, and obtaining the appropriate configuration information as requested by the requester; and (c) means for merging the configuration information obtained from the current map tree together with the configuration information obtained from the temporary tree, generating a network configuration information applicable to the time specified by the requester, and returning the generated network configuration information to the requester.

According to a third aspect, there is provided a network configuration data management system comprising:

(a) a directory server including:

(a1) a current map tree for containing information for current network configuration conditions organised into a directory tree format, and (a2) a temporary map tree for containing differential information for a future network configuration organised into a directory tree structure that represents a difference resulting from any changes made to the current network configuration; and (b) a network configuration information management apparatus including:

(b1) network configuration data control means that responds to a request from any external application for providing network configuration data management functions by performing operations on the map data, (b2) current map tree access means for accessing the current map tree within the directory server to retrieve appropriate information therefrom, and updating the retrieved information, and (b3) temporary map tree access means for accessing the temporary map tree within the directory server to perform generating, modifying and deleting operations, wherein a future network configuration information that represents the information expected to occur at any future time later than the current time may be generated by merging the information in the current map tree together with the information in the temporary map tree.

According to a fourth aspect, there is provided a network configuration data management method comprising the steps of:

storing and managing, in a store section, a current map containing current network configuration information organised into a hierarchical structure and a temporary map containing the information for components for which configuration changes are expected to occur in the future; and merging the information in the current map together with the information in the temporary map to generate a future network configuration information that represents an information applicable to a particular time later than the current time.

According to a fifth aspect, there is provided a network configuration data management method comprising the steps of:

(a) storing in a directory server: a current map tree for containing network configuration information organised into a tree structure, and a temporary map tree for only containing information for those network components for which configuration changes are expected to occur at any future time later than the current time;

(b) merging the current map tree together with the temporary map tree that contains information applicable to any particular future time, to generate a future network configuration information;

(c) in response to a request for the network configuration information applicable to any future time from a requester, issuing a request to access the current map tree and temporary map tree stored in the directory server for searching for the trees containing the directory entries, and retrieving the network configuration information as requested;

(d) merging the configuration retrieved from the current map tree together with the configuration information retrieved from the temporary map tree to generate a network configuration information applicable to the particular future time; and (e) returning the generated network configuration information to the requester.

According to a sixth aspect, there is provided a network configuration data management method for use in a system comprising a network configuration information management apparatus, the network configuration information management apparatus including:

(a) a directory server for storing a current map tree that contains information for current network configuration conditions organised into a directory tree structure and a temporary map tree that contains future configuration information, organised into a directory tree structure, that represents a difference from the current network configuration resulting from any changes made to the current network configuration;

(b) network configuration data control means for providing the network configuration data management functions by performing operations on the map data in response to a request from any external application;

(c) current map tree access means for accessing the current map tree stored in the directory server to retrieve the information therefrom, and updating the retrieved information and (d) a temporary map tree access means for accessing the temporary map tree stored in the directory server, and generating, modifying and updating the information therein.

The network configuration data management method comprises the steps of:

(A1) receiving, at the network configuration data control means, a request for modifying configuration data from any external application, the network configuration data control means responding to the request to request that the temporary map tree access means generate a temporary map entry as a root for the temporary map tree, and the temporary map tree access means responding to the request from the network configuration data control means to access the directory server for generating the temporary map entry;

(A2) sorting data instructed in the request, termed as "request data", for modifying the configuration data for each entry, in the order of the directory tree hierarchy beginning with a top level toward a bottom level;

(A3) retrieving the sorted data in the request sequentially, and checking them to determine whether what is requested is to add, modify, or delete an entry;

(A4) dividing the processing steps into add, modify and delete, based on the results of the checking, (A5) if it is determined that an entry is to be added, generating an entry designated as Add in the temporary map tree;

(A6) if it is determined that any existing entry is to be modified, generating an entry designated as Modify in the temporary map tree; and (A7) if it is determined that the information for any existing entry is to be deleted, generating an entry designated as Delete in the temporary map tree.

According to a seventh aspect, there is provided a computer program (or program product) for being executed on a computer including a network configuration information management apparatus that comprises:

a directory server storing:

a current map tree that contains information for the current network condition organised into a directory tree structure, and a temporary map tree that contains information for the future network configuration, organised into a directory tree structure, that represents a difference from a current network configuration resulting from changes made to the current network configuration;

a network configuration data control means responsive to a request received from any external application for performing operations on the map data and providing network configuration data management functions;

a current map tree access means for retrieving and updating the information from the current map tree stored in the directory server; and a temporary map tree access means for performing the generating, modifying, and deleting operations for the temporary map tree stored in the directory server, the functional and processing features of the network configuration data control means, the current map tree access means and the temporary map tee access means being implemented by the computer program.

The program causes the network configuration data control means to perform the steps of:

(A1) receiving a request for change in the configuration from an external application, and requesting that the temporary map tree access means access the directory server to generate a temporary map entry as a root of the temporary map tree;

(A2) sorting the data instructed in the configuration change request, in the order of the directory tree hierarchy beginning with a top level toward a bottom level;

(A3) retrieving the sorted data in the request sequentially, and determining from the retrieved data that it requests that an entry is to be added, modified, or deleted;

(A4) based on the result determined in step (A3), dividing the processing steps into Add, Modify and Delete, otherwise treating the request as an error;

(A5) if it is determined that Add is requested, generating an entry designated as Add in the temporary map tree;

(A6) if it is determined that Modify is requested, generating an entry designated as Modify in the temporary map tree; and (A7) if it is determined that Delete is requested, generating an entry designated as Delete in the temporary map tree.

Other aspects and features are set forth in the entire claims, which are incorporated herein by reference thereto.

BRIEF DESCRIPTION OF THE DRAWINGS

FIGS. 4(a)–4(d) are diagram that help any person skilled in the relevant art understand how the configuration could be changed according to one embodiment of the present invention;

FIG. 5 illustrates an example of the format of the data described in the request that is passed from any external application to the network configuration data control means according to one embodiment of the present invention;

FIGS. 10(a)–10(b) and 10(a') are diagrams that help any person skilled in the relevant art understand the process of generating a new current map according to one embodiment of the present invention;

FIGS. 16(a)–16(b) are diagrams that help any person skilled in the relevant art understand the third embodiment of the present invention;

FIGS. 17(a)–17(c) and 17(a') are diagrams that help any person skilled in the relevant art understand the third embodiment of the present invention;

PREFERRED EMBODIMENTS OF THE INVENTION

Figure 1:
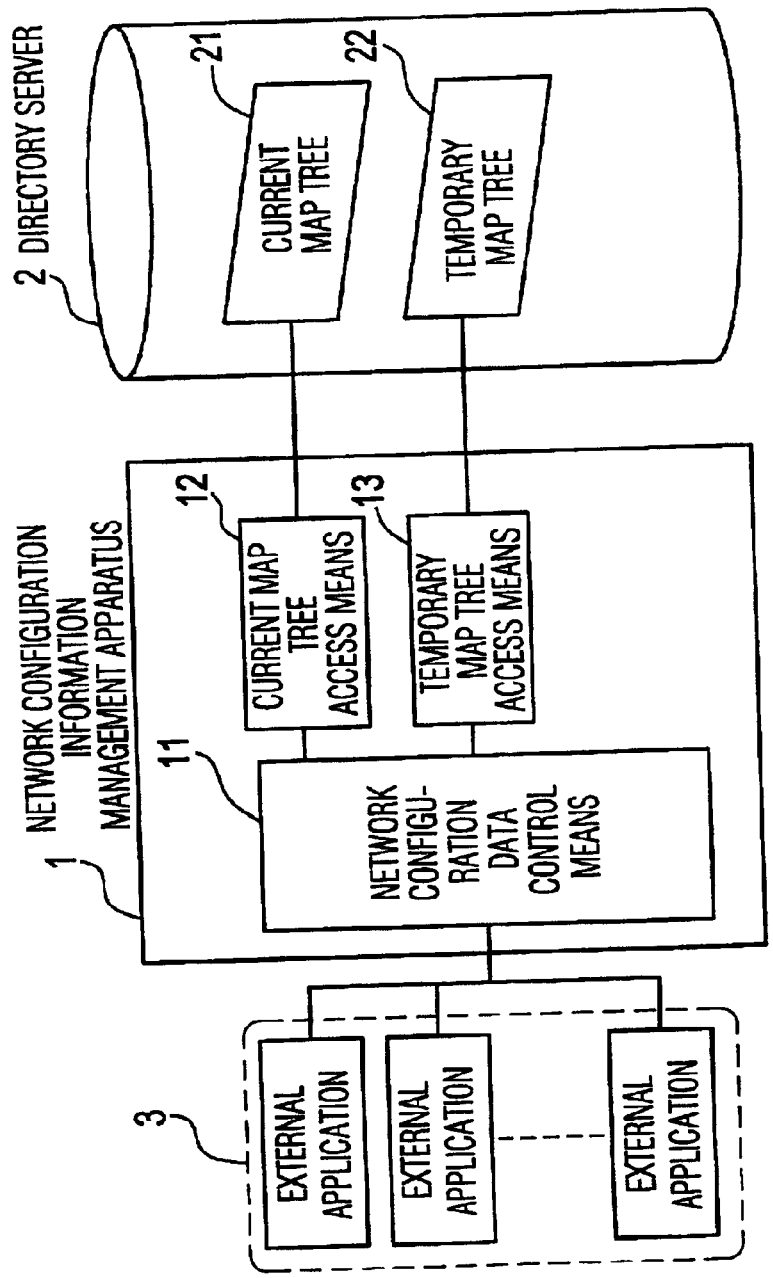
FIG. 1 illustrates the network configuration according to one embodiment of the present invention.

The embodiments of the present invention are now described. Referring to FIG. 2, individual network components in the present invention may be stored as nodes that are organized into the tree structure called as the "network map", having the directory entry as a root.

In one preferred embodiment, the system according to the present invention includes a directory server (2) on which a current map tree (21) and a temporary map tree (22) may be stored, wherein the current map tree (21) contains the current network configuration information organized into the tree structure, and the temporary map tree (22) only contains the information for those network components, organized into the tree structure, for which the configuration changes are expected to occur in the future.

The future network configuration information may be obtained by merging the current map tree (21) together with the temporary map tree (22) that contains the information for the components for which the configuration may be setup up to a particular future time.

When the request for the network configuration information is received from any external application (3), the network configuration data control means (11) within the network configuration information management apparatus (1) is then requested to obtain the network configuration information that is applicable to any future time. In response to the request, the network configuration data control means (11) requests that the current map tree access means (12) and the temporary map tree access means access the current map tree (21) and temporary map tree (22) stored in the directory server (3) to search for the trees containing the directory entries, respectively. After the configuration information as requested is obtained, the network configuration data control means (11) merges the information in the current map tree with the information in the temporary map tree to generate the network configuration information that is applicable to the specified future time, y map tree, which may be returned to the external application (3).

According to the present invention, the current configuration information can be stored in the network map, and the differential information that represents the difference from the current configuration resulting from any changes made to the current configuration can be stored in the temporary map tree. In this way, the requirements for the resources including the storage can be reduced, and the network configuration information that is applicable to any time can be obtained.

In another embodiment of the present invention, the directory server (2) may further include a log map tree (23) that contains the log information for the network components for which the configuration changes occurred at any time in the past, and the network configuration information management apparatus (1) may further include a log map tree access means (14), wherein in response to the request for the network configuration information that is applicable to any particular past time, the network configuration data control means (11) may request that the current map tree access means and the log map tree access means access the current map tree and the log map tree both stored in the directory server, respectively, in order to retrieve the appropriate information from the respective map trees. Then, the past network configuration information may be obtained by merging the current map tree information together with the log map information that may have been setup up to the particular past time.

In one aspect, the method of the present invention concerns a network configuration data management method for use in a system comprising a network configuration information management apparatus, the network configuration information management apparatus including:

a directory server (2) for storing a current map tree (21) that contains the information for the current network configuration organized into a directory tree format and a temporary map tree (22) that contains the differential information for any future network configuration, organized into a directory tree format, that represents the difference from the current network configuration resulting from any changes made to the current network configuration;

a network configuration data control means (11) responsive to a request from any external application (3) for performing the operations on the man data and managing the network configuration data;

a current map tree access means (12) for retrieving the information from the current map tree stored in said directory server and updating the retrieved information; and a temporary map tree access means (13) for generating, modifying and updating the information in the temporary map tree stored in said directory server, the network configuration data management method comprising the step of causing the network configuration data control means to perform the steps of:

(A1) receiving a request for changing the configuration data from the external application, said network configuration data control means responding to the request to request that temporary map tree access means generate a temporary map entry as the root for the temporary map tree, and said temporary map tree access means responding to the request from said network configuration data control means to access said directory server for generating the temporary map entry;

(A2) sorting the data instructed in the request for changing the configuration data, beginning with the top level of the directory tree hierarchy toward the bottom level; and (A3) retrieving said sorted data sequentially, checking the data to determine whether what is requested is to add, modify, or delete an entry, and dividing the processing steps into add, modify and delete, based on the results of the checking, the processing steps including:

(A5) if it is determined that an entry is to be added, generating an appropriate entry designated as Add in the temporary map tree;

(A7) if it is determined that any existing entry is to be modified, generating an appropriate entry designated as Modify in the temporary map tree; and (A9) if it is determined that the existing entry information is to be deleted, generating an appropriate entry designated as Delete in the temporary map tree.

The network configuration data management method further includes the step of updating the current map tree to a new version that has been stored in the directory server by merging the current map tree and the temporary map tree, wherein the network configuration data control access means performs the steps of:

(E1) collecting, through the temporary map tree access means, the information for any entries located under the temporary map entry being merged and that are to be deleted, modified or added;

(E2) determining how many entries have been collected, wherein if it is determined that the number of entries collected is equal to zero, the process is ended, and if it is determined that the number of entries collected is equal to one or more, (E3) processing, through the current map tree access means, the appropriate entry designated as Delete, so that is can be deleted from the current map tree;

(E4) processing, through the current map tree access means, the appropriate entry designated as Modify, so that it can be modified in the current map tree;

(E5) processing, through the current map tree access means, the appropriate entry designated as Add, so that it can be added to the current map tree; and (E6) after all designated entries under the temporary map tree have been processed and merged, writing the completion time into the appropriate temporary map entry through the temporary map tree access means.

In another aspect, the method of the present invention concerns the network configuration information management method, wherein the directory server further includes a log map tree for containing the log information for the network components for which the configuration changes occurred in the past, and the network configuration information management apparatus further includes a log map tree access means, the method further including the step of causing the network configuration data control means to respond to the request for the network configuration information that is applicable to any particular past time for obtaining, through the current map tree access means and the log map tree access means, the information in the current map tree and the information in the log map tree both stored in the directory server, respectively, the past network configuration information being obtained by merging the information in the current map together with the information in the log map that is applicable to any particular time up to the specified past time.

In the two aspects of the method, the processing and functional features performed by the individual steps may be implemented by a computer program that is executed on a computer comprising the network configuration information management apparatus. The program code may be stored on any recording medium such as FD (floppy disk), CD-ROM, DVD, magnetic tape, semi conductor memory, and the like, from which the program code may be read through any mechanical reader so that it can run on the computer. The program code may reside on any remote server computer, from which it may be downloaded onto the computer over the network.

In order to provide a better understanding of the embodiments of the present invention described so far, several examples are shown and described by referring to the drawings.

FIG. 1 illustrates the configuration of one example. Referring to FIG. 1, generally, the configuration includes a directory server 2 on which the network configuration information is stored in the tree form, an external application generally referred to as 3, and a network configuration information management apparatus 1 that is connected to the directory server 2 and provides the management functions such as generating, modifying and deleting the network configuration information.

Specifically, the directory server 2 may store a current map tree 21 that contains the current network configuration conditions organized into a directory tree format, and a temporary map tree 22 that contains the differential information for the future network configuration information, organized into the directory tree format, that represents the difference from the current network configuration resulting from any changes made to the current network configuration.

The network configuration information apparatus 1 includes a network configuration data control means 11 that manages the network configuration data by performing the operations on the different types of map data in response to the request from the external application 3, a current map tree access means 12 that is operated to retrieve and update the information in the current map tree 21, and a temporary map tree access means 13 that performs the functions for the temporary map tree 22, such as generating, modifying and deleting In one embodiment of the present invention, the processing functions performed by each of the means 11, 12 and 13 within the network configuration information management apparatus 1 may be implemented by a computer program that is executed on the computer comprising the network configuration information management apparatus 1.

Referring next to FIGS. 2 and 3, the structure of the network configuration data (information) in one embodiment of the present invention is described.

Figure 2A:
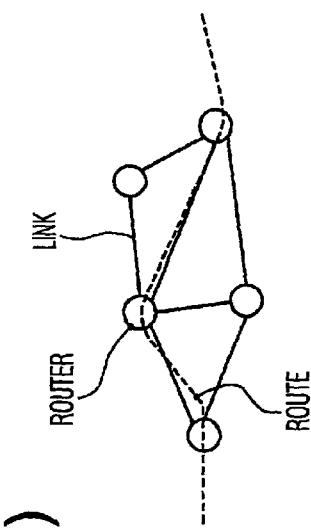
FIGS. 2(a)–2(b) are diagrams that help any person skilled in the relevant art understand one embodiment of the present invention.

FIG. 2(a) represents one example of the network structure in one example of the present invention. As shown in FIG. 2(a), the network structure includes nodes of the network where routers are located, links interconnecting the routers, and routes formed by connecting the links.

Figure 2B:
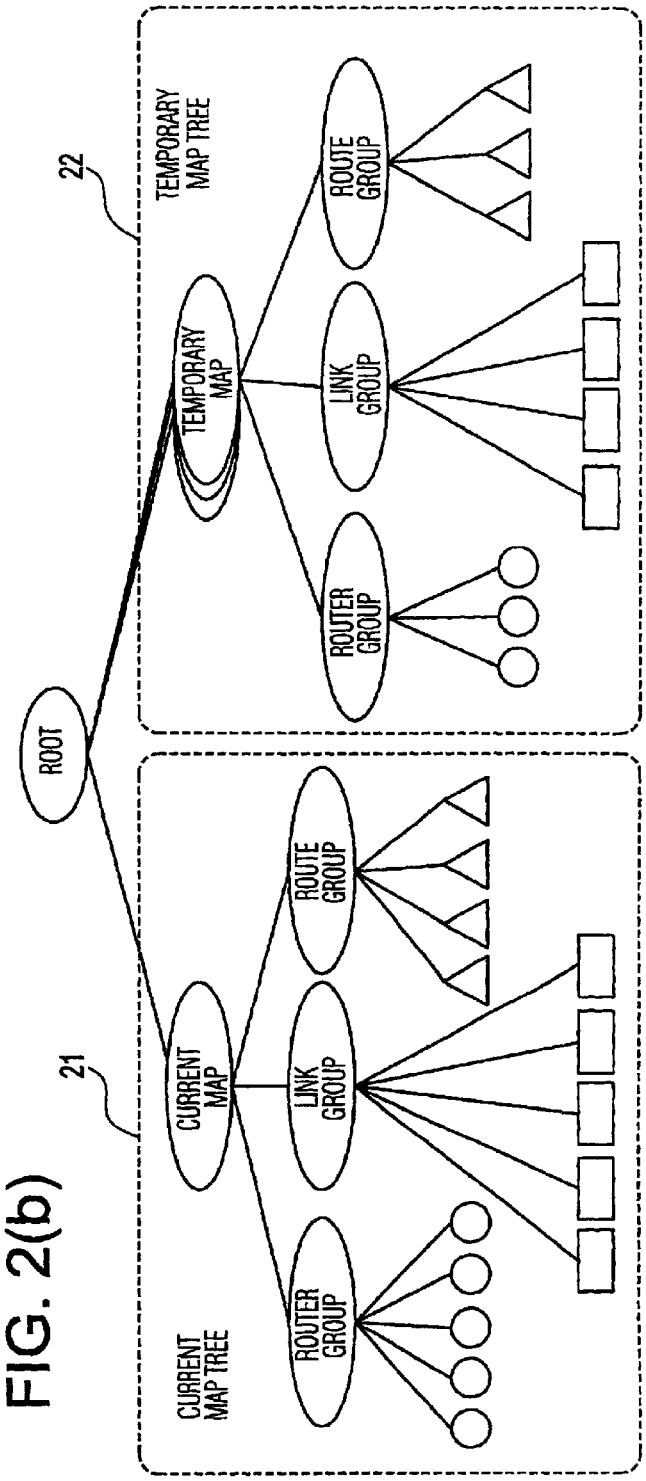

FIG. 2(b) shows the tree structure that contains the network components shown in FIG. 2(a) that are organized into a directory tree format. Each of the network components has a one-to-one mapping correspondence to each directory entry that acts as a node in the directory tree.

The tree structure includes the root entry at the top level, under which the entries for the current map tree 21 and the entries for the temporary map tree 22 may be generated, respectively, and each of the map entries may have an entry for the router group (router group), an entry for the link group (link entry) and an entry for the route group (route entry) that are generated under each respective map entry.

Each group entry may have entries corresponding to the router, link and route that are generated under each respective group entry.

Figure 3A:
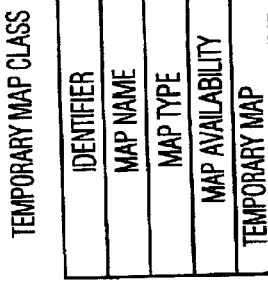
FIGS. 3(a)–3(c) are diagrams that helps any person skilled in the relevant art understand one embodiment of the present invention, including the current map class, the temporary map class, and the directories under the respective maps.
Figure 3B:
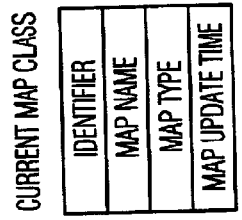
Figure 3C:
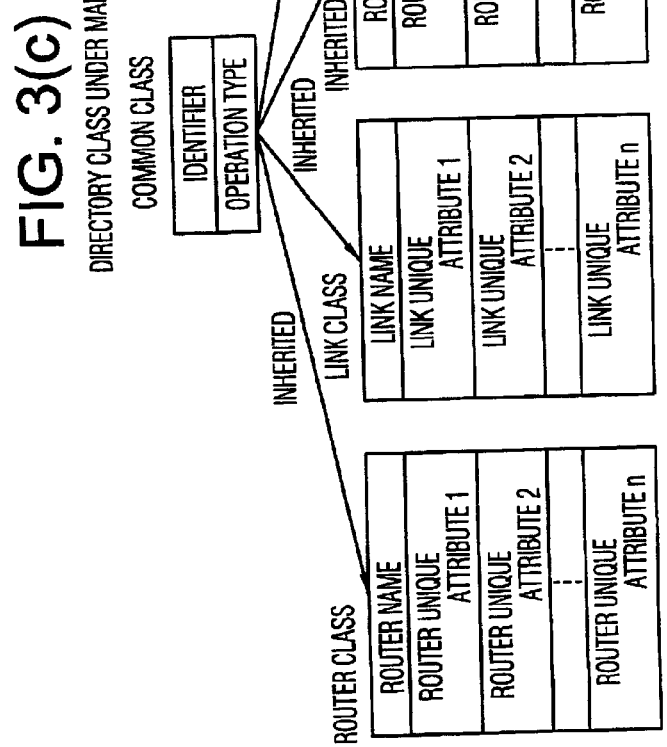

FIGS. 3(a), 3(b), and 3(c) illustrates how the map and directory classes are defined for use in one embodiment of the present invention, and shows the data structure for each entry in each of the map and directory classes. Each directory entry has an identifier that identifies the location of the entry within the directory tree, and its own entry name included in the identifier. Those are the required attributes.

The current map entry shown in FIG. 3(a) is defined to include the following elements:
  (a) identifier,
  (b) map name,
  (c) type of the map, and
  (d) the time when the current map tree was updated.

The temporary map entry shown in FIG. 3(b) is defined to include the following elements:
  (a) identifier,
  (b) map name,
  (c) type of the map,
  (d) map availability flag, which indicates whether the temporary map tree is permitted to be applied to the current map tree,
  (f) the time when the temporary map tree was generated, and the time when the temporary map tree is expected to be applied, and
  (g) the time when the temporary map tree was actually applied to the current map tree.

As shown in FIG. 3(c), the directory entry under the map entry has the class definition, which includes the following elements as the common class:

(a) identifier, and (b) type of the operation, which may be applied to the entry when the temporary map tree is merged with the current map tree.

The type of the operation may have the attribute value, such as "Add", "Modify", "Delete", and "Not Applicable".

The attribute value "Add" means that a directory entry should be added if it does not exist in the current map tree.

The attribute value "Modify" means that the attribute for the directory entry should be modified, if the directory entry already exists in the current map tree.

The attribute value "Delete" means that the directory entry should be delete, if it already exists in the current map tree.

The attribute value "Not Applicable" means "no operation" that is applied when the parent entry for the entry designated as Modify is generated for the purpose of the convenience. This is done to ensure the integrity of the temporary map tree structure.

The router class, link class, route class, and group class may have the respective attributes inherited from those in the common class definition. Those attributes are unique to each class.

Referring now to FIGS. 4(a), 4(b), 4(c), and 4(d), the operation of one embodiment of the present invention is described. FIGS. 4(a)–4(d) illustrates the network configuration that may be used in conjunction with the operation that is described below.

FIG. 4(a) represents the network configuration that includes four routers and four links interconnecting the routers, and FIG. 4(b) shows that the network configuration is organized into the directory tree.

The following description assumes that the current network configuration is to be changed as shown in FIG. 4(c). To accomplish this, a temporary map tree is created, which is then merged with the current map tree. FIG. 4(d) represents the new directory tree that results from making changes to the current network configuration.

It is shown in FIG. 4(c) that the new network configuration may include an additional router 5 and additional links 5 and 6 by adding them to the initial network configuration (FIG. 4(a)). It is also shown that the attribute information for the route 1, router 2 and router 4 may be modified, and the link 4 may be deleted from the configuration.

Those changes in the network configuration that are expected to occur may be stored as the directory tree data under the temporary map entry.

FIG. 5 is an example of the data described in a request (request data) that is passed from an external application 3 to the network configuration control means 11. The request may optionally contain the information associated with the directory entry for which the configuration changes are expected to occur.

Referring next to FIGS. 6, 7, 8 and 9, the following describes the operation that occurs when an entry is generated in the temporary map tree.

Figure 6:
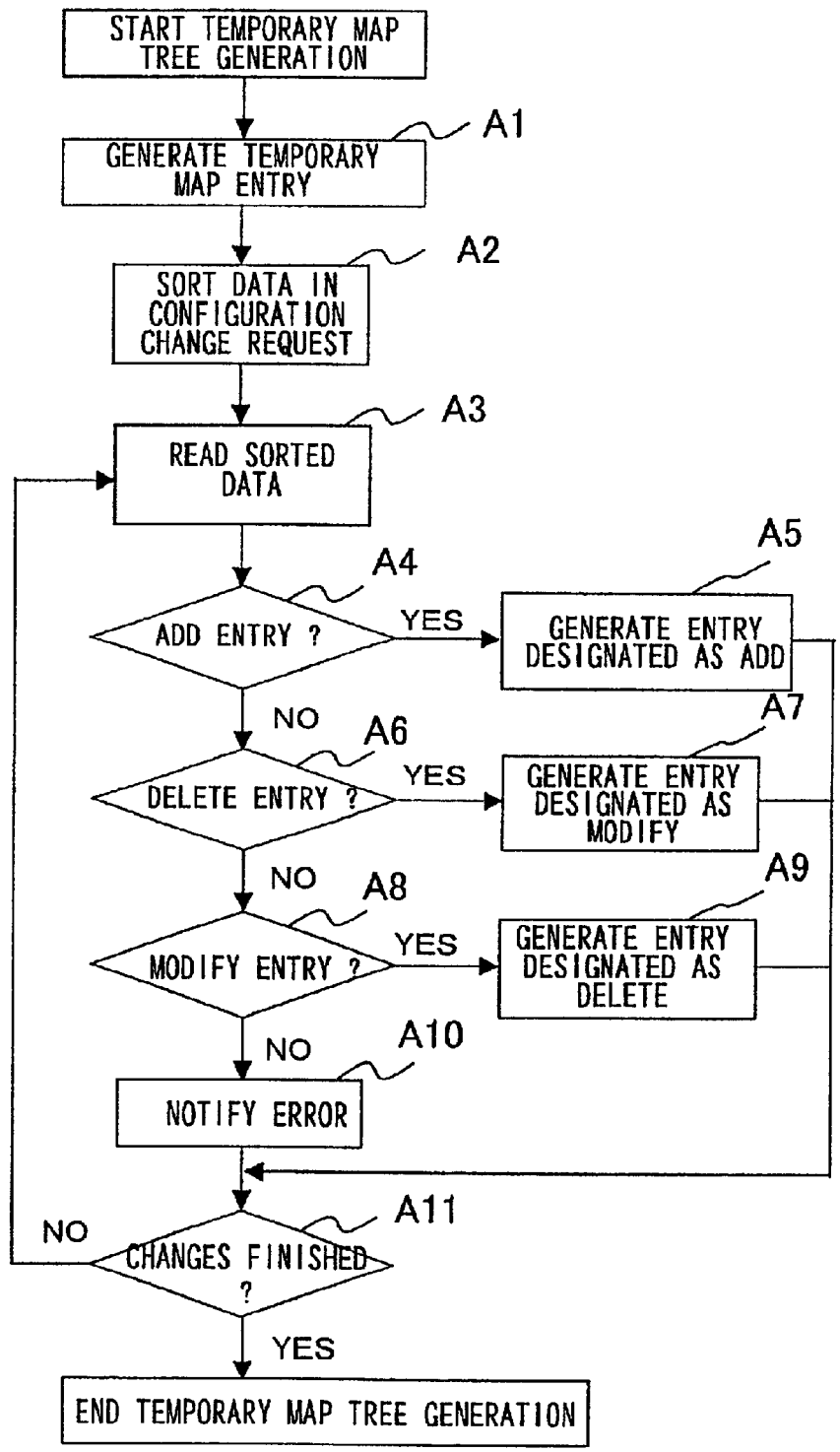
FIG. 6 is a flowchart that depicts the process of generating an entry in the temporary map tree according to one embodiment of the invention.

Referring first to FIG. 6, upon receiving the request shown in FIG. 5 from the external application 3, the network configuration data control means 11 may first request that the temporary map tree access means 13 generate a temporary map entry that serves as the root for the temporary map tree.

Then, the temporary map tree access means 13 may access the directory server 2, and may generate the temporary map entry (step A1 in FIG. 6).

In this embodiment, the temporary map entry may have the identifier that has the format of "map name=temp. map 1, root name=root". For simplicity, the description for the root entry is omitted.

It is noted that during the entry generation process, the time when the temporary map is expected to be applied and the time when the temporary map was generated may be stored as the attributes for the temporary map entry, respectively.

At a next step (step A2), the network configuration data control means 11 may sort the data instructed by the individual requests, in the order of the directory tree hierarchy beginning with the top level toward the bottom level.

This is to avoid that any conflict occurs in the hierarchy by beginning the sort processing with the top level in the directory tree hierarchy. In this embodiment, the processing for the router, link and route may be bypassed because they are located at the same hierarchical level.

Then, the data instructed in the individual requests thus sorted may be retrieved sequentially, to allow the network configuration data control means 11 to determine what type of operation is requested, such as add, modify and delete (step A3)

If it is determined that the type of operation requested is to add an entry ("yes" in step A4), the process proceeds to step A5, where an entry designated as Add in the temporary map tree is generated.

If it is determined that the type of operation requested is to modify the existing entry ("yes" in step A6), the process proceeds to step A7, where an entry designated as Modify in the temporary map tree is generated.

If it is determined that the type of operation requested is to delete the existing entry information ("yes" in step A8), the process proceeds to step A9, where an entry designated as Delete in the temporary map tree is generated.

If it is determined that the type of operation requested is anything other than add, modify and delete (that is, "not applicable"), this is treated as an error, and the external application 3 is so notified (step A10).

The steps A3 through A11 will be repeated until the processing for all requests has been completed (that is, the decision at step A 11 s "no").

Figure 7:
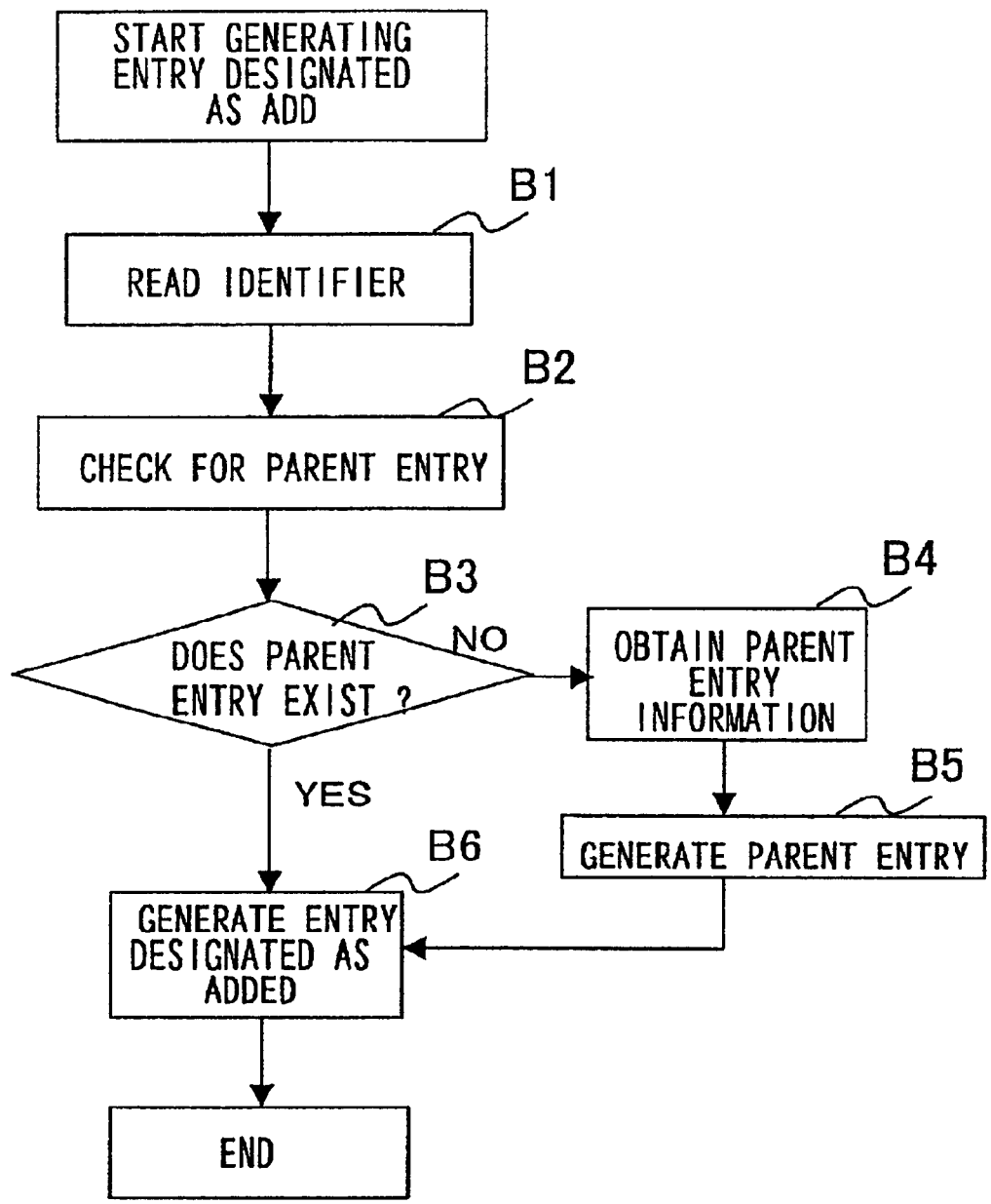
FIG. 7 is a flowchart that depicts the process of generating an entry designated as Add in the temporary map tree according to one embodiment of the present invention.

Referring now to FIG. 7, the process for generating an entry designated as Add in the temporary map tree is described. As shown in FIG. 7, the identifier that identifies the location of the entry in the directory tree is extracted from the retrieved data in the request (step B1 in FIG. 7).

Among the individual requests listed in FIG. 5, it may be seen that the request that specifies that a router 5 should be added, for example, contains the identifier that has the following format:

"{router name=router 5, group name=router group, map name= temporary map}"

Then, based on the extracted identifier, checking is made to determine whether the parent entry for the entry designated as Add has already been generated (step B2).

For the router 5, the group entry having the following identifier,

"{group name=router group, map name=temporary map 1}"

must have been generated as the parent entry.

The entry for the router 5 being added is the first entry that occurs after the temporary map entry is generated. In this case, however, it is found that the parent entry has not been generated Yet ("no" in step B3), and therefore the network configuration data control means 11 causes the current map tree access means 12 to access the directory server 2 in order to obtain the parent entry information that resides in the current map tree 21 (step B4), and then causes the temporary map tree access means 13 to generate the parent entry under the temporary map entry (step B5).

At this point, the temporary map tree access means 13 sets the type of operation that is the attribute of the parent entry to the value "not applicable". This is done to bypass the adding process when the temporary map tree 22 is merged with the current map tree 21, because the parent entry already exists in the current map tree, requiring no modification.

The entry that will be added as specified in the request is generated under the parent entry that has been generated through the temporary map tree access means 13.

In this case, the type of operation attribute is set to the value "add".

This is done to indicate that this additional entry must be added under a tree within the current map tree 21 when the temporary map tree 22 is merged with the current map tree 21.

Figure 8:
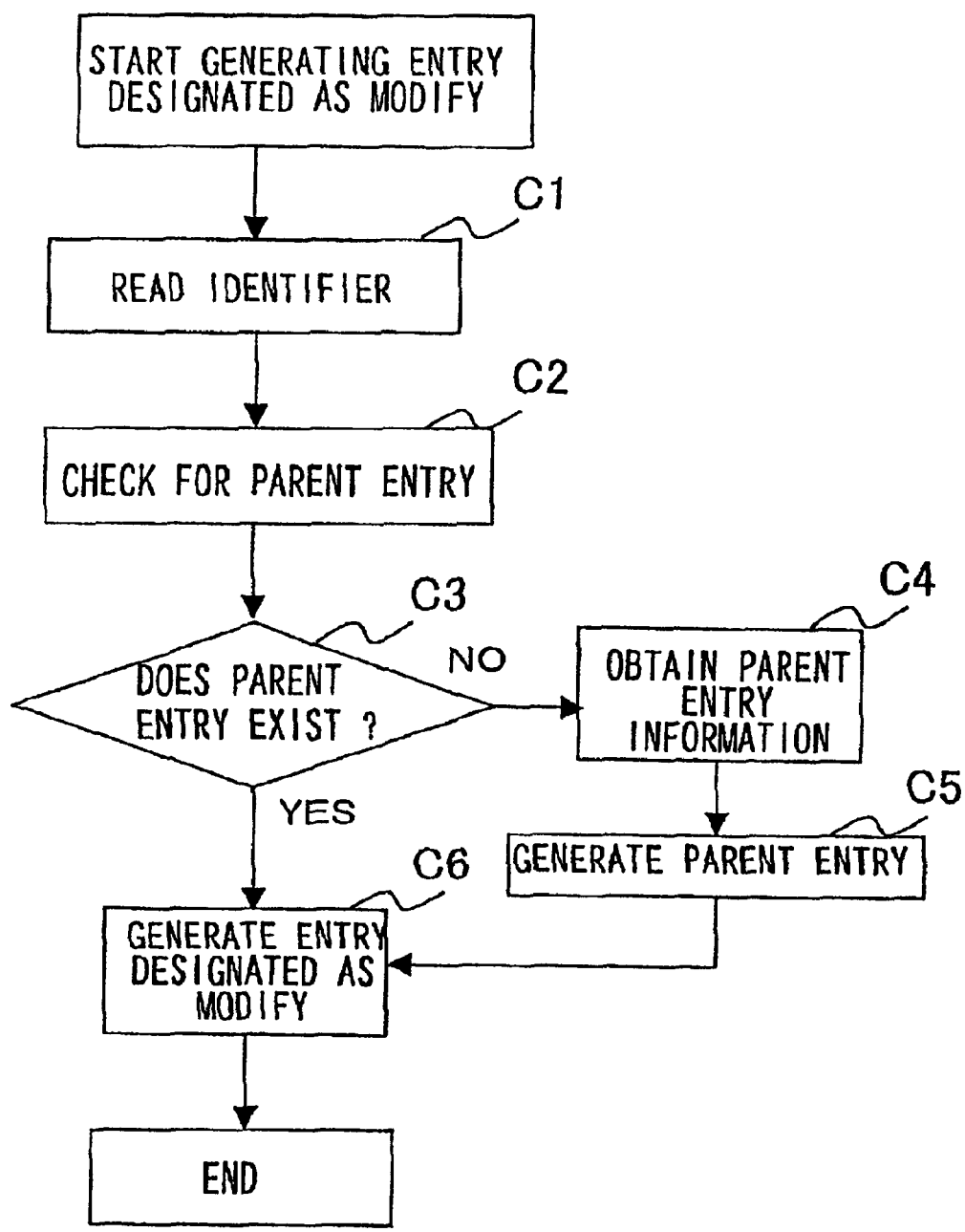
FIG. 8 is a flowchart that depicts the process of generating an entry designated as Modify in the temporary map tree according to one embodiment of the present invention.

Referring next to FIG. 8, the process for generating an entry designated as Modify in the temporary map tree is described. In FIG. 8, the appropriate identifier is extracted from the data in the request, as for the process for generating the entry designated as Add (step C1 in FIG. 8).

Among the requests listed in FIG. 5, the request that specifies that the route 1 should be modified, for example, contains the identifier that has the following format:

"{route name=route 1, group name=route group name, map name=temporary map 1}"

Then, based on the extracted identifier, checking is made to determine whether the parent entry for the entry designated as Modify has already been generated in the temporary tree.

For the route 1, the temporary map entry has already been generated, but it is found that the route group entry as identified by the identifier, "{group name=route group, map name=temporary map 1}"

has not been generated yet (that is, "no" in step C3).

Like the "add" process, therefore, the network configuration data control means 11 accesses the current map tree 21, from which it obtains the following information for the route group entry, "{group name=route group, map name=temporary map 1}"

and generates the parent entry under the temporary map entry (step C4, step C5).

Then, the entry that will be modified as specified in the request (route 1 in this case) is additionally added under the parent entry generated through the temporary map tree access means 13 (step C6).

In this case, the type of operation attribute is set to the value "modify". This is done to indicate that the appropriate entry that already exists in a tree within the current map tree 21 must be modified when the temporary map tree 22 is merged with the current map tree 21.

Figure 9:
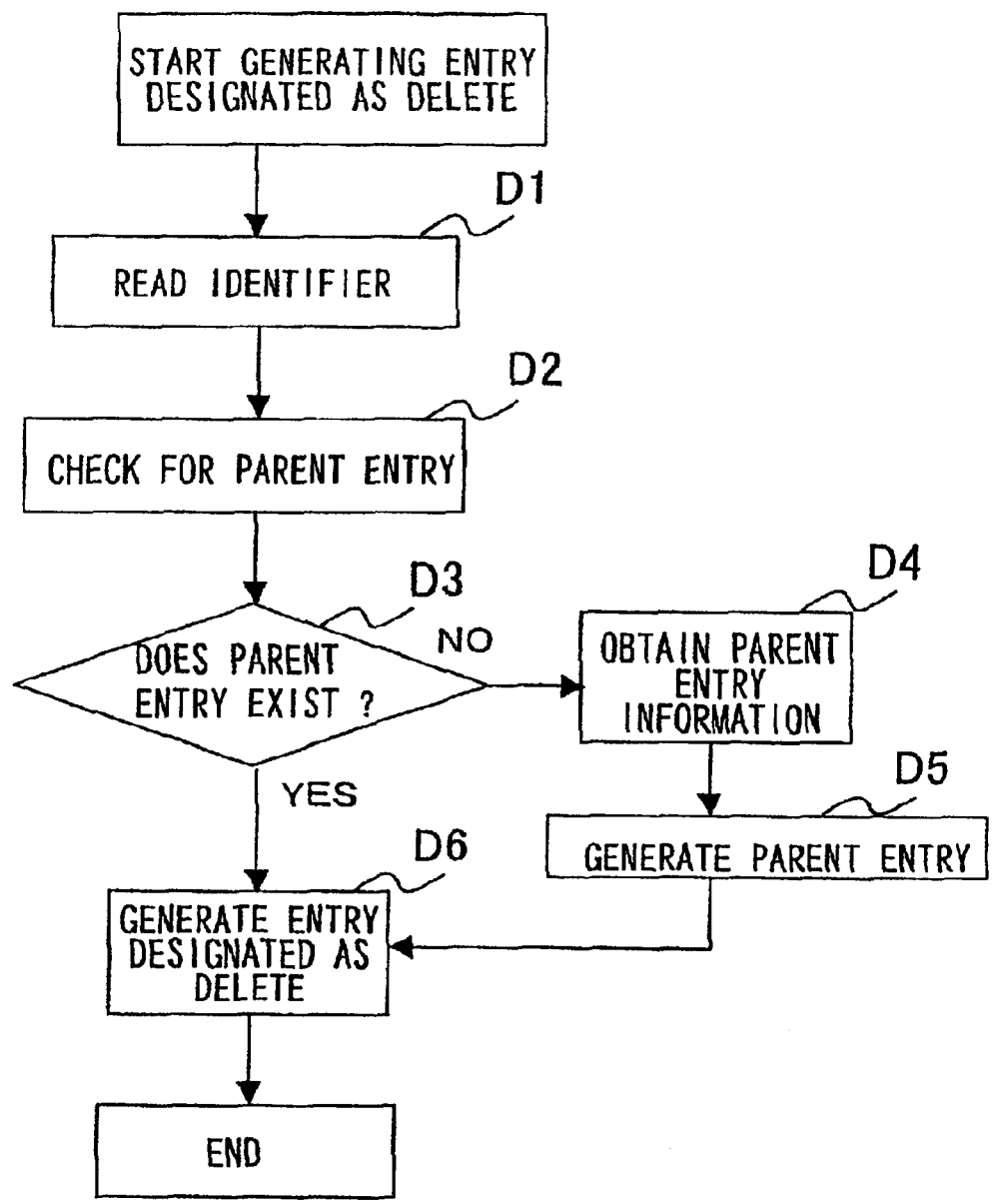
FIG. 9 is a flowchart that depicts the process of generating an entry designated as Delete in the temporary map tree according to one embodiment of the present invention.

Referring finally to FIG. 9, the process for generating an entry designated as Delete in the temporary map tree is described.

In FIG. 9, the identifier is extracted from the data in the request, just like the "add" process (step D1 in FIG. 9).

Among the requests listed in FIG. 5, the request that specifies that link 4 is to be deleted, for example, contains the identifier defined as "{link name=link 4, group name= link group, map name=temporary map 1}".

Then, based on the extracted identifier, checking is made to determine whether the parent entry for the entry designated as Delete has already been generated in the temporary map tree (step D2).

For the link 4, the temporary map entry has already been generated, but it is found that the link group entry as identified by the identifier "{group name=link group, map name=temporary map 1}" has not been generated yet (that is, "no" in step D).

Like the "add" process, the network configuration data control means 11 accesses the current map tree 21, from which it obtains the following information for the route group entry, "{group name=link group, map name=temporary map 1}"

and generates the parent entry under the temporary map entry (step D4, step D5).

The entry that will be deleted as specified in the request (link 4 in this case) is additionally generated under the parent entry generated through the temporary map tree access means (step D6).

In this case, the type of operation attribute is set to the value "delete". This is done to indicate that the appropriate entry that already exists in the current map tree 21 should be deleted when the temporary map tree 22 is merged with the current map tree 21.

The temporary map tree that has been generated through the processes described above may be stored in the directory server 2 as the directory tree.

The tree under the temporary map entry may have the entry that requires the modification as well as the parent entry that exists but requires no modification.

The operation of one embodiment of the present invention that is described below by referring to FIG. 11 involves the process of merging the current map tree together with the temporary map tree, thereby updating the current map tree stored in the directory server 2.

Figure 11:
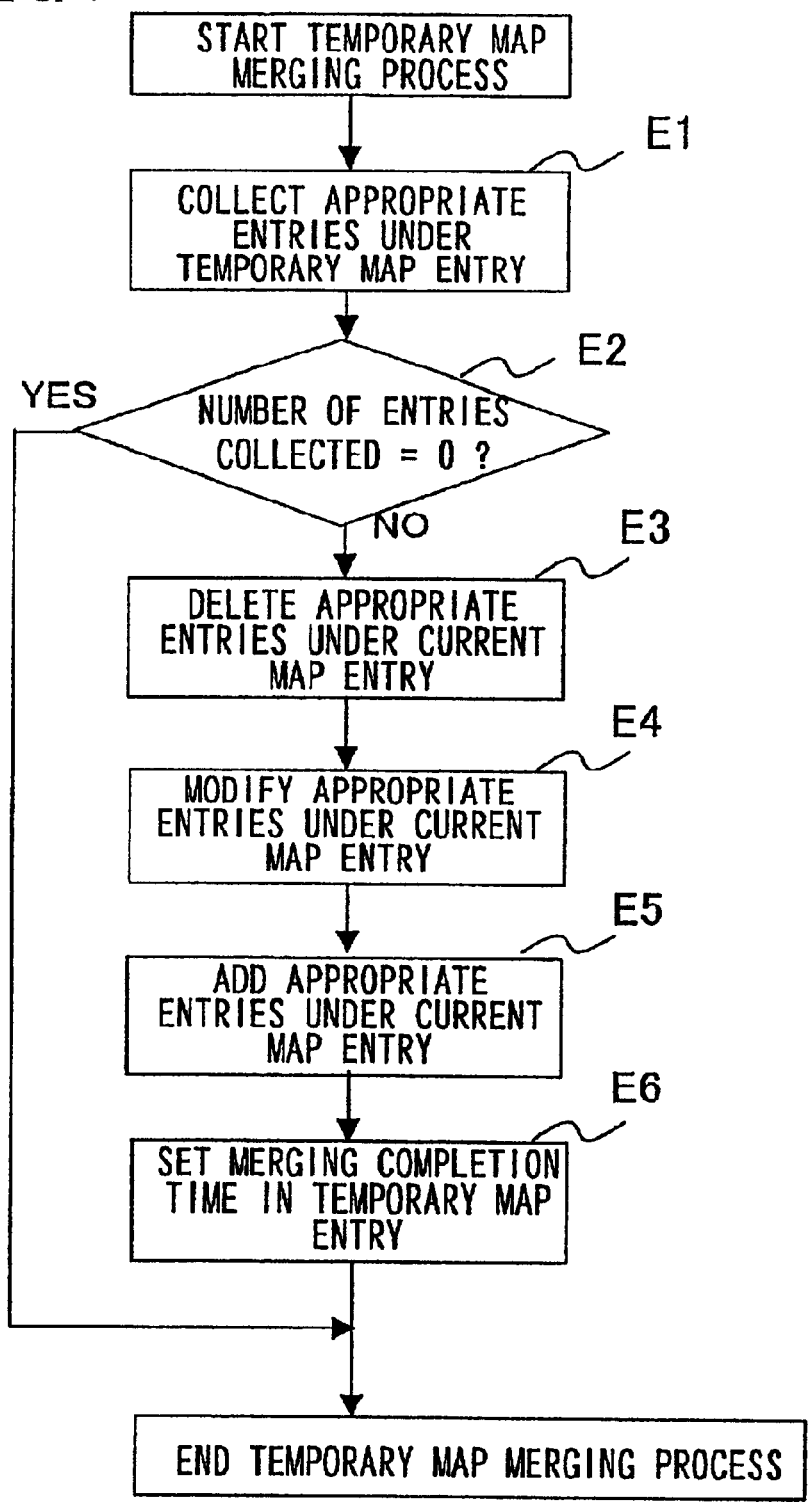
FIG. 11 is a flowchart that depicts the process of merging the current map tree and temporary map tree to produce an updated version of the current map tree stored on the directory server.

As shown in FIG. 11, the network configuration data control means 11 begins with collecting the information associated with all applicable entries, that is, those entries having the type of operation attribute values specified as other than the "not applicable" (step E1 in FIG. 11).

In one embodiment of the present invention, the information associated with the router 2, router 4, router 5, link 4, link 5, link 6, and route 1 that are located under the temporary map 1 shown in FIG. 10(b) may be collected.

The router group, link group, and route group entry under the temporary map 1 are not applicable, because they have the type of operation attribute value of "not applicable".

When the number of entries collected is found to be none or zero ("Yes" in step E2), the process ends.

When one or more entries have been collected, the first step is to delete the entries having the type of operation attribute specified as "delete" from the current map tree, which is performed through the current map tree access means 12 (step E3).

The second step is to modify the entries having the type of operation attribute specified as "modify" in the current map tree, which is performed through the current map tree access means 12 (step E4).

The third step is to add the entries having the type of operation attribute specified as "add" in the current map tree, which is performed through the current map tree access means 12 (step E5).

The final step is to write, into the temporary map entry, the time when all of the applicable entries under the temporary map entry have been processed as appropriate, or the time when the merging processing has completed (step E6).

Figure 12C:
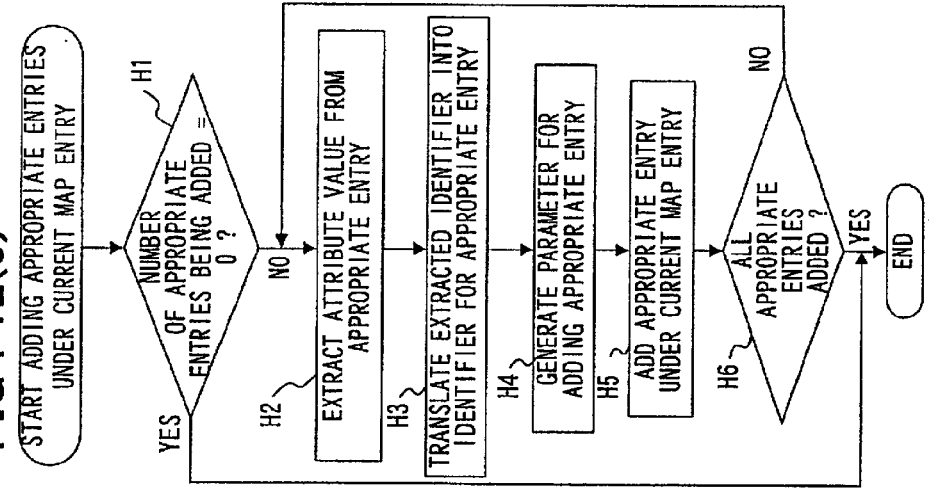
FIGS. 12(a)–12(c) are flowcharts that depict the process of deleting, modifying, and adding an entry under the current map entry during the current and temporary map merging process (FIG. 11) according to one embodiment of the present invention.
Figure 12B:
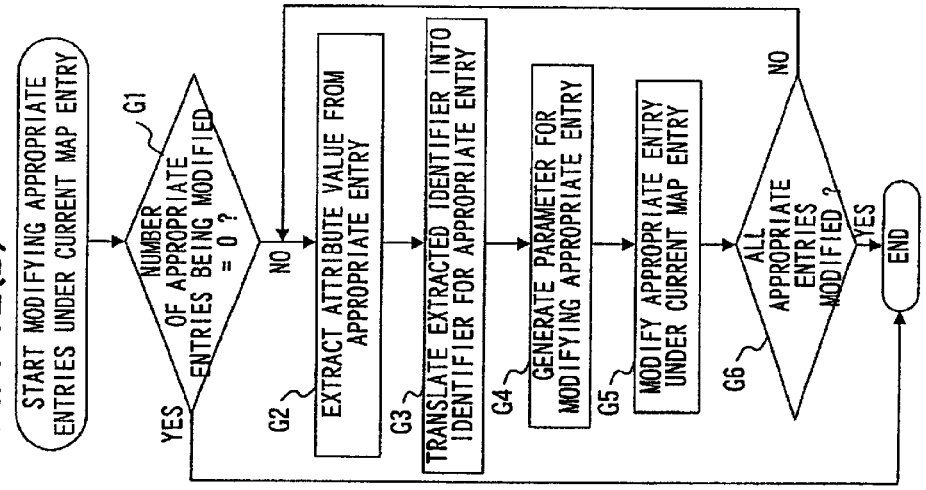
Figure 12A:
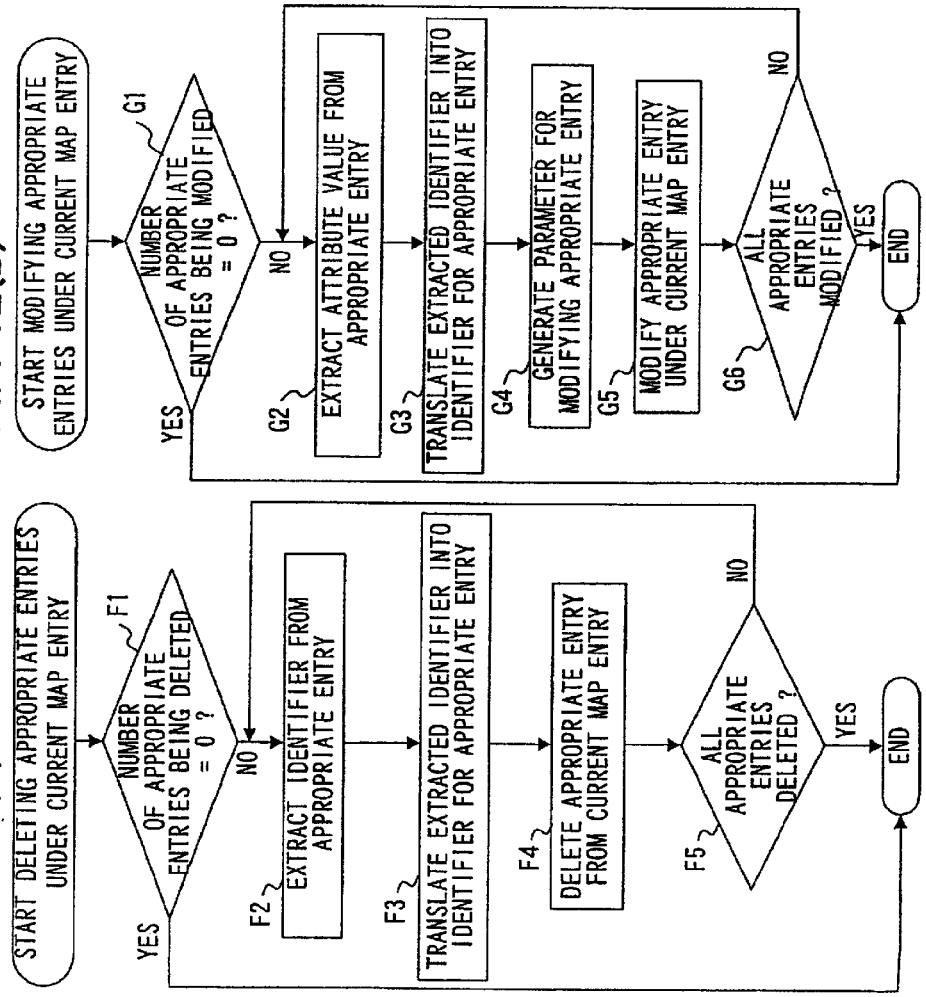

Referring now to FIG. 12(a), the operation is described more specifically, for each of the steps E3, E4 and E5 shown in FIG. 11.

FIG. 12(a) represents an example of the operation of the process that occurs at the step E3 shown in FIG. 11, where the entry that resides under the current map entry is to be deleted. In FIG. 12(a), if it is determined that there are one or more entries under the temporary map tree that are designated as Delete (that is, the number of such entries is non-zero) ("no" in step F1), the network configuration data control means 11 extracts the identifier for the appropriate entry from the information for the applicable entry that has been collected through the temporary map tree access means 13 (step F2).

In this case, the entry that is designated as Delete is "link 4", and the identifier for the appropriate entry that has been extracted is:

"{link name=link 4, group name=link group, map name=temporary map 1}"

Then, this identifier is translated into the corresponding identifier for the entry that resides under the current map tree and is designated as Delete. This corresponds to the entry that is located at the origin (root) of the tree between the current map tree 21 and temporary map tree 22, that is, in this case, the tree structures are equivalent except for the "current map" and the "temporary map 1". Thus, only the map name=portion in the extracted identifier needs to be replaced by the "current map".

For the link 4, for example, the following identifier

"{link name=link 4, group name=link group, map name=temporary map 1}"

may be changed as follows:

"{link name=link 4, group name=link group, map name=current map}"

Then, the network configuration data control means 11 uses the extracted identifier as a parameter, and causes the current map tree access means 12 to delete the entry that resides under the current map entry (step F4).

The steps F2 through F5 may be repeated until all applicable entries have been deleted.

FIG. 12(b) represents an example of the operation of the process that occurs at the step E4 shown in FIG. 11, where the entry that resides under the current map entry is to be modified.

In FIG. 12(b), if it is determined that there are one or more entries under the temporary map tree that are designated as Delete ("no" in step G1), the network configuration data control means 11 extracts the identifier for the appropriate entry from the information for the appropriate entry that has been collected through the temporary map tree access means 13 (step G2).

In one embodiment of the present invention, the entries that are designated as Modify may include the route 1, router 2 and router 4. For the route 1, for example, the identifier that has been extracted is defined as:

"{route name=route 1, group name=route group, map name=temporary map 1}"

The above identifier is then translated into the corresponding identifier for the applicable entry that resides under the current map entry (step G3).

Specifically, like the delete process shown in FIG. 12(a), the identifier for the route 1 that is defined as:

"{route name=route 1, group name=route group, map name=temporary map 1}"

is translated into the following:

"{route name=route 1, group name=route group, map name=current map 1}"

Then, the network configuration data control means 11 generates a parameter that specifies the modification, based on the information for the applicable entry under the temporary map entry (step G4).

Then, the network configuration data control means 11 modifies the entry that resides under the current map entry, which is performed through the current map tree access means 12 (step G5).

The steps G2 through G6 may be repeated until all of the applicable entries have been modified.

FIG. 12(c) represents an example of the operation of the process that occurs at the step E5 shown in FIG. 11, where an additional entry is to be added under the current map entry.

In FIG. 12(c), if it is determined that there are one or more entries under the temporary map tree that are designated as Add ("no" in step H1), the network configuration data control means 11 extracts the identifier for the appropriate entry from the information for the appropriate entry that has been collected through the temporary map tree access means 13 (step H2).

In this embodiment, the entries that are designated as Add may include the router 5, router 5 and link 6. For the router 5, for example, the identifier that has been extracted is defined as:

"{router name=router 5, group name=router group, map name=temporary map 1}"

The above identifier is then translated into the corresponding identifier for the appropriate entry that resides under the current map entry (step H3).

Specifically, like the delete process shown in FIG. 12(a), the identifier for the router 5 that is defined as:

"{router name=router 5, group name=router group, map name=temporary map 1}"

is translated into the following:

"{router name=router 5, group name=route group, map name=current map 1}"

Then, the network configuration data control means 11 generates a parameter that specifies the addition, based on the information for the appropriate entry under the temporary map entry (step H4).

Then, the network configuration data control means 11 adds the entry under the current map entry, which is performed through the current map tree access means 12 (step H5).

The steps H2 through H6 may be repeated until all of the applicable entries have been added.

The current map tree shown in FIG. 10(a) may be changed into a new current map tree shown in FIG. 10(a') by merging the entries in the current and temporary map trees.

Several temporary map trees may previously be generated, and the network configuration may be changed by performing the sequential merging process for the information in those temporary map trees, when the appropriate expected times as set in the temporary map entries arrive.

Next, another embodiment of the present invention is described. In the following description, it is assumed that several temporary map trees are generated, and are then stored in the directory server 2. Then, when the request for the network configuration information that is applicable to any particular time is received from any external application 3, the trees may be searched, and the search results may be returned to the application 3.

Figure 13:
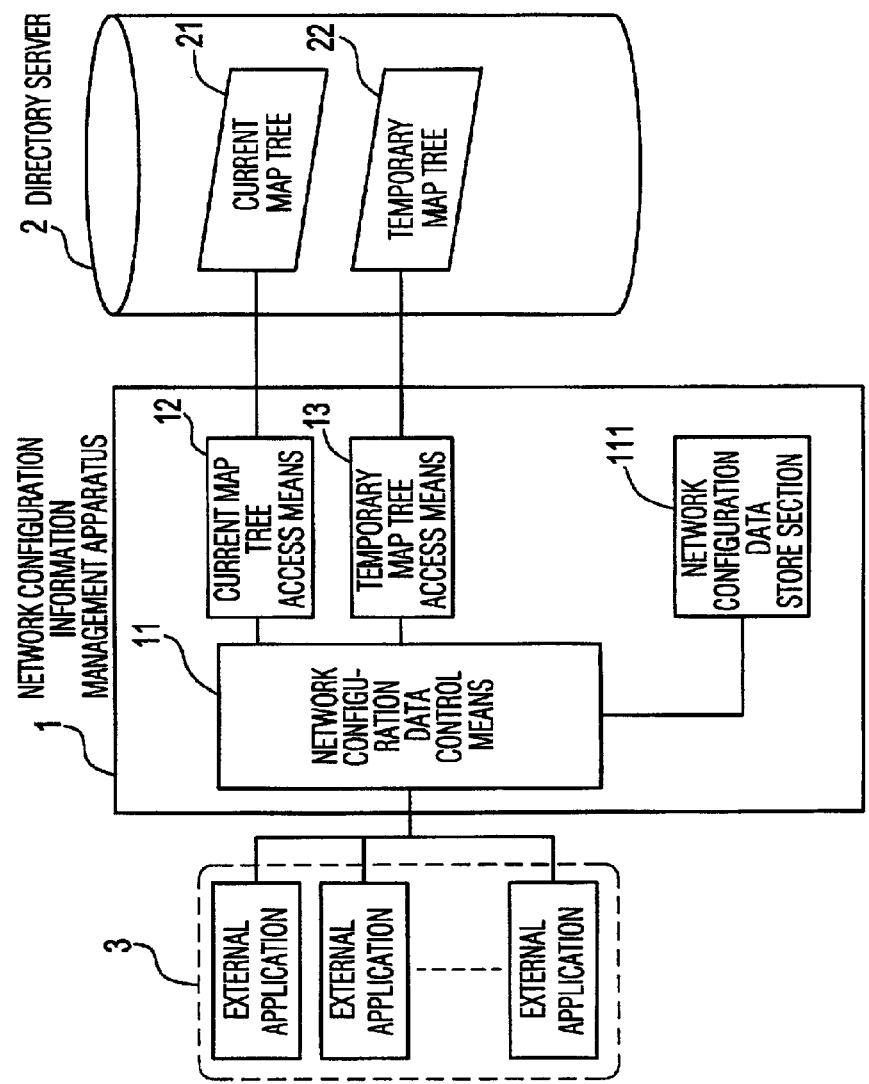
FIG. 13 illustrates the network configuration according to a second embodiment of the present invention.
Figure 14:
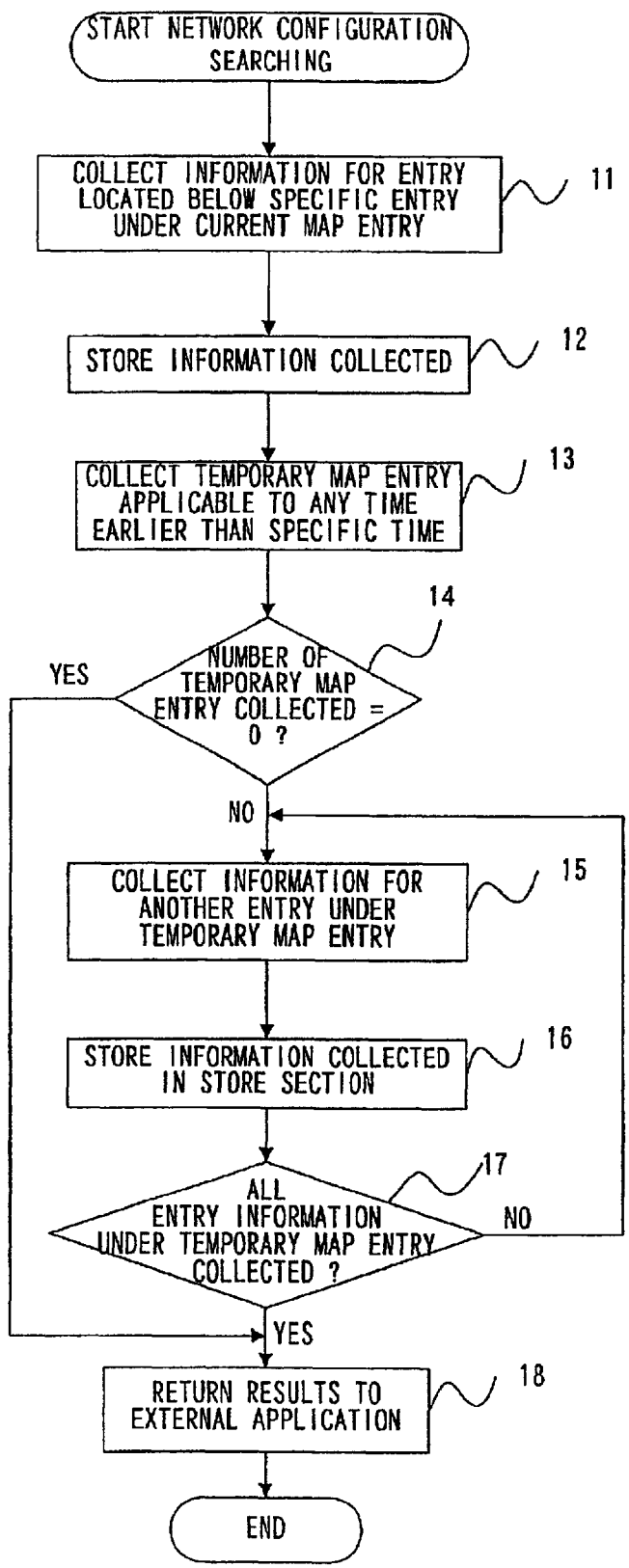
FIG. 14 is a flowchart that depicts the process according to the second embodiment of the present invention.

FIG. 13 shows the system configuration according to the second embodiment of the present invention. It may be seen from FIG. 13 that the system configuration according to the second embodiment is similar to that shown in FIG. 1, wherein it includes the network configuration information management apparatus 1 that is connected to the network configuration data control means 11. Specifically, the apparatus 1 contains a network configuration data store section 111 for storing the directory tree information temporarily. FIG. 14 is a flowchart depicting the steps that are performed according to the second embodiment.

Referring to FIG. 14, the process begins at step I1, where the network configuration data control means 11 causes the current map tree access means 12 to access the current map tree that contains the current network configuration information, in order to obtain the information for the component as specified by the appropriate entry located under the current map entry.

The information obtained at step I1 is then stored temporarily in the network configuration data store section 111 (step I2).

Then, the temporary map tree access means 13 is caused to access the several temporary map trees to search for the appropriate temporary map entry information applicable to any particular time earlier than the current time specified by the external application 3 (step I3).

If the number of temporary map entries for which the information has thus been collected is found to be zero ("no" in step I4), the entry information under the current map entry that has been obtained at step I1 may be used, and is returned to the external application 3 as it is (step I8).

If the number of temporary map entries for which the information has been collected is found to be one or more ("yes" in step I4), the entry information under the temporary map entries and specified by the external application 3 may be collected, for each temporary map entry obtained through the temporary map tree access means 13 (step I5).

Then, the network configuration data control means 11 may be operated to merge the entry information under the temporary map entry that has been collected with the current map tree previously stored in the network configuration data store section 111 (step I6).

This merge processing may occur in the same manner as for the merge processing described in connection with FIG. 11 and FIG. 12, but it should be noted that it occurs against the network configuration data store section 111, but not against the directory server 2.

The steps I5 through 17 may be repeated until all of the temporary map entries have been collected and merged ("no" in step I7).

Finally, after the information under the current map entries stored in the network configuration data store section 111 has been collected and updated, it may be returned to the external application 3 (step I8).

Figure 15:
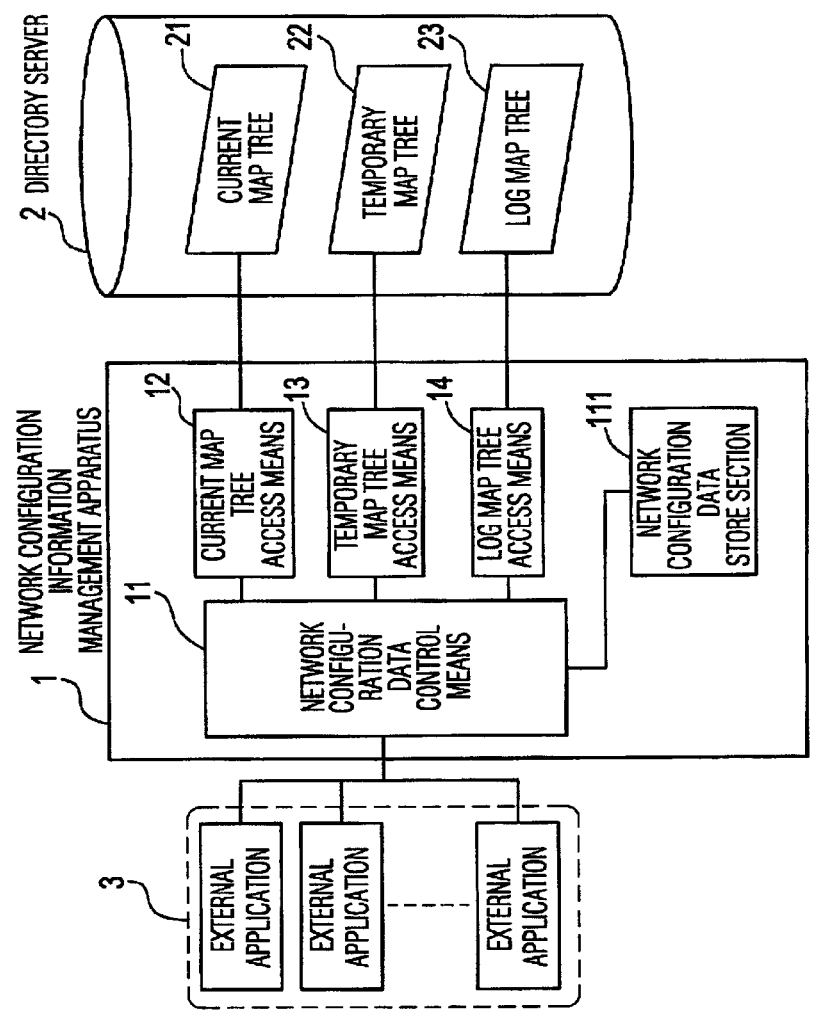
FIG. 15 illustrates the network configuration according to a third embodiment of the present invention.

A further embodiment of the present invention is next described by referring to FIG. 15, which illustrates the system configuration according to this (third) embodiment.

Referring to FIG. 15, the system configuration according to the third embodiment includes a log map access means 14 and a log map 23, which are added to the system configuration in the preceding embodiment shown in FIG. 13.

According to the third embodiment of the present invention, the future network configuration information as well as the network configuration information that occurred in the past may be searched for. The functions provided by each of the means 11, 12, 13, and 14 in the network configuration information management apparatus 1 may be implemented by a computer program that is executed by the computer.

The log map 23 is organized into a directory tree that may store, as the directory entry information, the information used to restore the processing results to its original state that have been obtained by merging the temporary map tree 22 together with the current map tree 21.

The log map class shown in FIG. 16(*a*) is defined to include the following elements:
 (a) identifier,
 (b) map name,
 (c) map type, and
 (d) time of log map generation.

As shown in FIG. 16(*b*), the class definition for the routers and links that reside under the log map entry is the same as that shown in FIG. 3.

The log map access means 14 is connected to the directory server 2, and may have access to the log map 23 for generating, modifying, and deleting the entries therein.

Figure 18C:
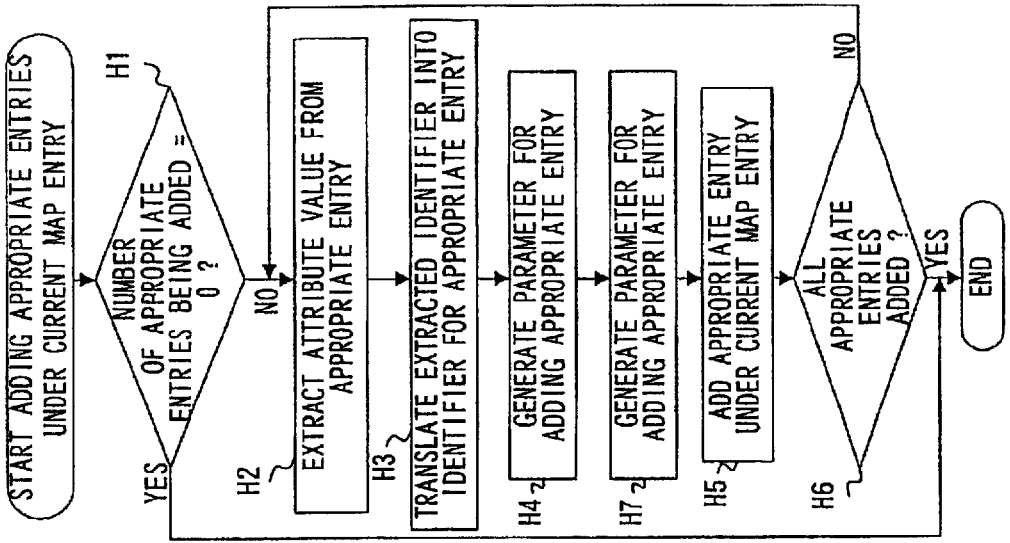
FIGS. 18(a)–18(c) are flowcharts that depict the process of deleting, modifying, and adding an entry under the current map entry according to the third embodiment of the present invention.
Figure 18B:
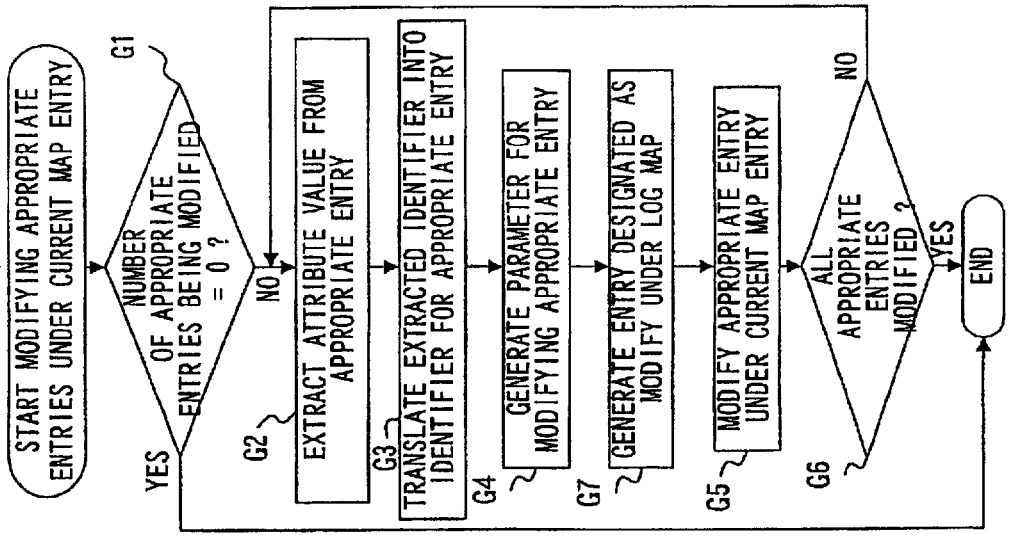
Figure 18A:
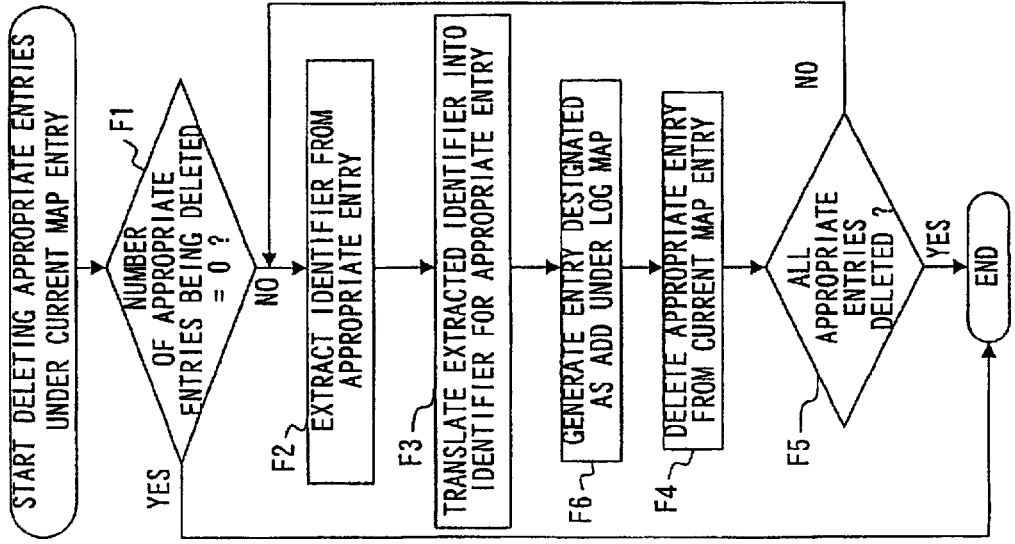

The operation of the third embodiment of the present invention is now described by referring to FIGS. 17, 18 and 19.

FIGS. 17(*a*), 17(*b*), and 17(*c*) represent the network configuration that includes the log map tree (c) that is added to the network configuration shown in FIGS. 10(*a*), 10(*a'*), and 10(*b*) and described in connection with the first embodiment by changing the directory tree to reflect such change. The log map 1 is designated as a root entry for the log map tree.

The entries under the root entry for the log map 1 may be generated by merging the temporary map 1 together with the current map, based on the entry information in the original current map tree (a) and the entry information under the temporary map 1 (b).

The log map tree may be generated when the entries in the temporary map tree are merged with the current map tree, as described above in the first embodiment, and an additional process is therefore included to allow log map tree entries to be generated as the individual current map trees shown in FIG. 12 are processed.

Referring to FIG. 18(*a*) through FIG. 18(*c*), the process includes steps F6, G7 and H7 for generating log map entries, which have been added to the process shown in FIG. 12(*a*) through FIG. 12(*c*), respectively.

Referring first to FIG. 18(*a*), if the type of operation for the entry applicable for being processed that has been obtained from the temporary map tree is found to be "delete", the "add" process, which is the opposite of the "delete" process, must be performed in the log map tree. Accordingly, the network configuration data control means 11 causes the log map access means 14 to generate a log map entry designated as Add as shown in step F6, before the appropriate entry is deleted from the current map tree as shown in step F4.

Similarly, as shown in FIG. 18(*b*), if the type of operation for the entry applicable for being processed that has been obtained from the temporary map tree is found to be "modify", the original entry that remains unchanged must be saved in the log map tree.

Accordingly, the network configuration data control means 11 causes the log map access means 14 to generate a log map entry to be modified as shown in step G7, before the appropriate entry in the current map tree is modified as shown in step G5.

Similarly, as shown in FIG. 18(c), if the type of operation for the entry being processed that has been obtained from the temporary map tree is found to be "add", the "delete" process, which is the opposite of the "add" process, must be performed in the log map tree.

Accordingly, the network configuration data control means 11 causes the log map access means 14 to generate a log map entry to be deleted as shown in step H7, before the appropriate entry in the current map tree is added as shown in step H5.

Figure 19B:
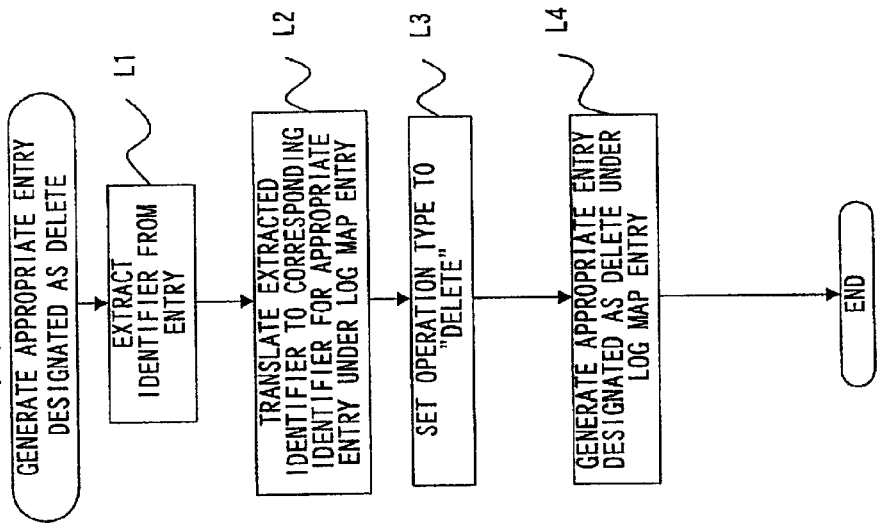
FIGS. 19(a)–19(b) are flowcharts that depict the process of generating an entry designated as Add or Modify in the log map according to the third embodiment of the present invention.
Figure 19A:
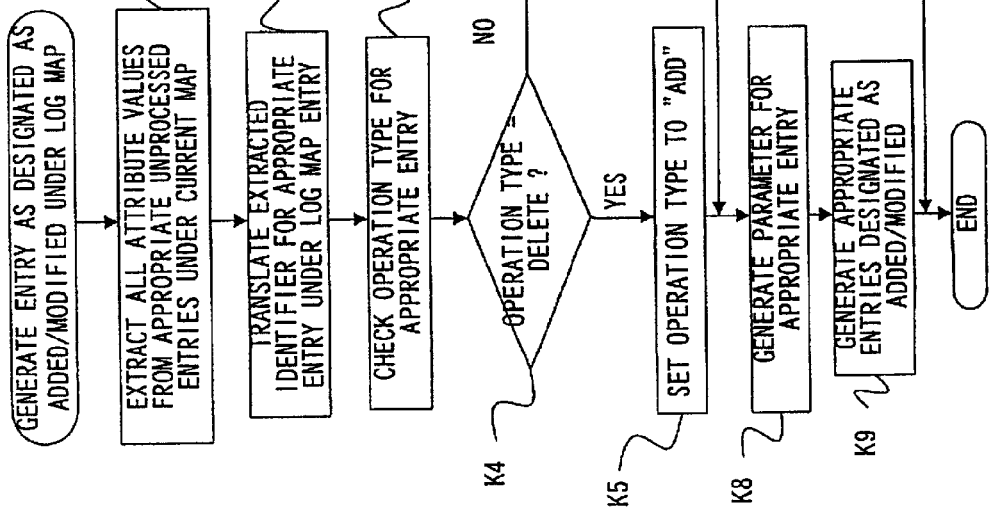

FIG. 19(a) and 19(b) provides the details of the respective operations performed by the steps F6, G7 and H7.

FIG. 19(a) is a flowchart that depicts the steps of generating an entry under the log map tree at the time when the corresponding entry in the temporary map tree is to be added and to be modified, respectively. FIG. 19(b) is a flowchart that depicts the steps of generating an entry under the log map tree when the corresponding entry in the temporary map tree is to be deleted.

Those steps are now described specifically. Referring first to FIG. 19(a), the network configuration data control means 11 causes the current map tree access means 12 to access the current map tree in order to obtain the entry information that is designated as Add or Delete, or the attribute value, from the corresponding entry in the current map tree (step K1).

Then, the identifier is extracted from the information obtained in step K1, and is translated into the corresponding identifier that will be placed under the log map tree (step K2). In the example shown in FIG. 17, where the entry for the link 4 is to be deleted from the current map tree, a corresponding entry to be added may be generated in the log map tree.

In this case, the identifier that is defined as:

"{link name=link 4, group name=link group, map name=current map}"

may be translated into the following identifier:

"{link name=link 4, group name=link group, map name=log map 1}"

How to check whether the parent entry already exists, and how to generate the parent entry into the log map tree are the same as for the temporary map entry generation, except that the parent entry is generated under the log map entry. No further description is provided, therefore.

Next, the value for the type of operation is checked (step K3) For the type of operation being "delete" ("yes" in step K4) the parameter that represents the type of operation for the corresponding entry being generated under the log map tree is set to the value "add", which is the opposite of "delete" (step K5).

For the type of operation being "modify" ("Yes" in step K6), the type of operation for the corresponding entry being generated under the log map tree is set to the same value, or "modify" (step K7).

Then, the network configuration data control means 11 generates the parameter for the corresponding entry being generated under the log map tree, based on the attribute value obtained from the entry under the current map tree (step K8).

Finally, the log map access means 14 is caused to generate the entry for the log map tree, which is saved in the directory server 2 (step K9).

Referring next to FIG. 19(b) the network configuration data control means 11 extracts the identifier from the information that is obtained, at step H2 in FIG. 18(c), from the entry under the temporary map tree that is to be added (step L1).

The identifier thus extracted is then translated into the corresponding identifier that is used for generating the corresponding entry designated as Delete under the log map entry (step L2). In the example shown in FIG. 17, where the entry for the router 5 is to be added under the current map tree, the corresponding entry designated as Delete may be generated into the log map tree. In this case, the identifier that is defined as:

"{router name=router 5, group name=router group, map name=temporary map 1}"

may be translated into the following identifier:

"{router name=router 5, group name=router group, map name=log map 1}"

Next, the network configuration data control means 11 sets the parameter that represents the type of operation for the entry being generated under the log map tree to the value "delete", which is the opposite of "add" (step L3).

Finally, the log map access means 14 is caused to generate the entry designated as Delete, which is placed under the log map entry (step L4).

When the network configuration information that is applicable to any particular time in the past is requested by any external application 3, the network configuration data control means 11 may cause the current map tree access means 12 and the log map tree access means 14 to access the current map tree 21 and log map 23 stored in the directory server 3, respectively, in order to obtain the information therein, and may send the information resulting from merging the map information back to the external application 3.

It may be appreciated that the third embodiment of the present invention provides the additional advantage in that the past network configuration information may be obtained by providing an additional log map tree entry, and then by merging the current map tree together with the log map that has been setup up to the particular past time specified by the external application.

Although the present invention has been described in reference to the particular embodiments thereof, it should be understood that those embodiments and the figures referenced in describing them are only presented for the illustrative purposes, and the present invention is not restricted to the embodiments described so far. It should be understood, therefore, that various changes and modifications may be made within the scope of the present invention defined in the appended claims as they are apparent to any person skilled in the art.

The meritorious effects of the present invention are summarized as follows.

It may be appreciated from the foregoing description that the present invention provides the following advantages that will be described specifically.

The first advantage of the present invention is that the network configuration information may be stored in the two different map trees organized into the tree structure, that is, the current map tree and the temporary map tree, that may reside in the directory server in the tree format, and is therefore to allow the user or application that is responsible for managing the network configuration information to have access to those map trees for obtaining the network configuration information that is expected to occur at any future time later than the current time.

The reason for this is that the temporary map tree, which keeps track of the expected applicable times, may be structured so that it only contains the differential information that represents the changes made to the current map tree, and that the network configuration information that is available at any specific times may be obtained by merging the temporary map tree and current map tree.

The second advantage of the present invention is to reduce the requirements for storing the network configuration information, as compared with the conventional way of copying the future network configuration information from the current configuration information, and then storing the copy separately from the current configuration information.

The reason for this is that the temporary map tree is structured so that it only contains the changes made to the current configuration information.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A network configuration data management system comprising:
   (a) a directory server including:
      (a1) a current map tree for containing information for current network configuration conditions organized into a directory tree format, and
      (a2) a temporary map tree for containing differential information for a future network configuration organized into a directory tree structure that represents a difference resulting from any changes made to the current network configuration; and
   (b) a network configuration information management apparatus including:
      (b1) network configuration data control means that responds to a request from any external application for providing network configuration data management functions by performing operations on map data,
      (b2) current map tree access means for accessing said current map tree within said directory server to retrieve appropriate information therefrom, and updating the retrieved information, and
      (b3) temporary map tree access means for accessing said temporary map tree within said directory server to perform generating, modifying and deleting operations,
   wherein a future network configuration information that represents the information expected to occur at any future time later than the current time may be generated by merging the information in said current map tree together with the information in said temporary map tree;
   wherein said network configuration information management apparatus includes a network configuration data store section for storing the directory tree information temporarily;
   wherein said network configuration data control means is configured for:
      accessing said current map tree containing the current network configuration information through said current map tree access means, and retrieving the information for the component as identified by an entry located under the current map entry from said current map tree;
      temporarily storing the information thus retrieved in said network configuration data store section;
      accessing said temporary map tree through said temporary map tree access means, and
      searching said temporary map tree for any temporary map entry information applicable to the time earlier than the time specified by said external application;
   wherein, if it is found that no such temporary map entry is available, meaning that the information retrieved from the current map entry is determined to be a search result, returning the current map entry information to said external application as it remains unchanged, and if it is found that one or more such temporary map entries are available, collects every entry information located under the temporary map entry and specified by said external application that has been retrieved from said temporary map tree through said temporary map tree access means;
   wherein said network configuration data control means is further configured for;
      merging the entry information under the temporary map entry and collected together with the current map tree previously stored in said network configuration data store means; and
      collecting all temporary map entries and merging them to update the entry information under the current map entry and stored in said network configuration data store section, and returning the updated version of the information to said external applications;
   wherein said directory server includes a log map tree for storing the log information that occurred in the past for a particular component;
   wherein said network configuration information management apparatus includes log map tree access means that allows said apparatus to access the log map tree; and
   wherein, if the network configuration information that may be applicable to any past time is requested, said network configuration data control means responds to that request for causing said map tree access means and said log map tree access means to accessing said current map tree and said log map tree within said directory server, respectively, and retrieve the information from the respective map tree, and for obtaining the past network configuration information by merging the information retrieved from the current map tree together with the log map information that has been setup up to said any past time.

2. In a system comprising a network configuration information management apparatus, the network configuration information management apparatus including:
   (a) a directory server for storing a current map tree that contains information for current network configuration conditions organized into a directory tree structure and a temporary map tree that contains future configuration information, organized into a directory tree structure, that represents a difference from the current network configuration resulting from any changes made to the current network configuration;
   (b) network configuration data control means for providing the network configuration data management functions by performing operations on map data in response to a request from any external application;
   (c) current map tree access means for accessing the current map tree stored in said directory server to retrieve the information therefrom, and updating the retrieved information; and (d) a temporary map tree access means for accessing the temporary map tree stored in said directory server, and generating, modifying and updating the information therein, a network configuration data management method comprising the steps of:

(A1) receiving, at said network configuration data control means, a request for modifying configuration data from any external application, said network configuration data control means responding to the request to request that the temporary map tree access means generate a temporary map entry as a root for the temporary map tree, and said temporary map tree access means responding to the request from said network configuration data control means to access said directory server for generating the temporary map entry;

(A2) sorting data instructed in the request, termed as "request data", for modifying the configuration data for each entry, in the order of the directory tree hierarchy beginning with a top level toward a bottom level;

(A3) retrieving said sorted data in the request sequentially, and checking them to determine whether what is requested is to add, modify, or delete an entry;

(A4) dividing processing steps into add, modify and delete, based on the results of the checking, (A5) if it is determined that an entry is to be added, generating an entry designated as Add in the temporary map tree;

(A6) if it is determined that any existing entry is to be modified, generating an entry designated as Modify in the temporary map tree; and (A7) if it is determined that the information for any existing entry is to be deleted, generating an entry designated as Delete in the temporary map tree;

wherein said directory server further includes a log map tree for storing log information for components that occurred in the past;

wherein said network configuration information management apparatus further includes a log map tree access means through which it has access to said log map tree; and wherein, in response to the request for the network configuration information that is applicable to any particular time in the past, said network configuration data control means obtains the information in the current map tree stored in said directory server as well as the information in said log map tree, through said current map tree access means and said log map tree access means, respectively, and then produces a new version of the network configuration information as requested by merging the information in said map tree together with the information in said log map tree that has been setup up to said particular past time.

3. The network configuration data management method as defined in claim 2, wherein the step of generating an entry designated as Add in the temporary map tree includes the steps of:

(B1) extracting an appropriate identifier identifying the location of entry in said directory tree from an identifier contained in the retrieved request data;

(B2) based on the extracted identifier, checking whether a parent entry for the entry designated as Add already exists in said temporary map tree;

(B3) if it is determined that the parent entry does not exist, causing said network configuration data control means to access said directory server through said current map tree access means and retrieve a parent entry information that resides in said current map tree stored in said directory server;

(B4) generating a parent entry under the temporary map entry through said temporary map tree access means, wherein as the parent entry exists in said current map tree, requiring no modification, when said temporary map tree is merged together with said current map tree, said temporary map tree access means bypasses the generating step, setting a value for the type of operation that is one attribute of the parent entry in a directory class under the map to "Not Applicable (N/A)"; and (B5) generating the entry designated as Add in the request, and adding the entry under the parent entry generated through said temporary map tree access means, wherein when said temporary map tree is merged together with said current map tree, the attribute value for the operation type in the directory class under the tree is set to "Add" to indicate that a new entry should be added in said current map tree.

4. The network configuration data management method as defined in claim 2, wherein the step of generating an entry designated as Modify in the temporary map tree includes the steps of:

(C1) retrieving the appropriate identifier identifying the location of entry in said directory tree from identifiers contained in the retrieved request data;

(C2) based on the retrieved identifier, checking whether the parent entry for the entry designated as Modify already exists in said temporary map tree;

(C3) if it is determined that the parent entry does not exist, causing said network configuration data control means to access said directory server through said current map tree access means and retrieve the parent entry information that resides in said current map tree stored in said directory server;

(C4) generating a parent entry under the temporary map entry through said temporary map tree access means, wherein as the parent entry exists in said current map tree, requiring no modification, at the time when said temporary map tree is merged together with said current map tree, said temporary map tree access means bypasses the generating step, setting a value for the operation type that is one attribute of the parent entry in the directory class under the map to "Not Applicable (N/A)"; and (C5) generating an entry designated as Modify in the request data, and adding the entry under the parent entry generated through said temporary map tree access means, wherein when said temporary map tree is merged together with said current map tree, the attribute value for the operation type in the directory class under the map tree is set to "Modify" to indicate that said existing entry should be modified in said current map tree.

5. The network configuration data management method as defined in claim 2, wherein the step of generating an entry designated as Delete in the temporary map tree includes the steps of:

(D1) retrieving the appropriate identifier identifying the location of entry in said directory tree from the identifiers contained in the retrieved request data;

(D2) based on the retrieved identifier, checking whether the parent entry for the entry designated as Delete already exists in said temporary map tree;

(D3) if it is determined that the parent entry does not exist, causing said network configuration data control means to access said directory server through said current map tree access means and retrieve the parent entry information that resides in said current map tree stored in said directory server;

(D4) generating a parent entry under the temporary map entry through said temporary map tree access means, wherein as the parent entry exists in said current map tree, requiring no modification, at the time when said temporary map tree is merged together with said is current map tree, said temporary map tree access means bypasses the generating step, setting the value for the operation type that is one attribute of the parent entry in the directory class under the map to "Not Applicable (N/A)"; and (B5) generating the entry designated as Modify as requested, and adding the entry under the parent entry generated through said temporary map tree access means, wherein when said temporary map tree is merged together with said current map tree, the attribute value for the operation class in the directory class under the tree is set to "Delete" to indicate that said existing entry should be deleted in said current map tree.

6. The network configuration data management method as defined in claim 2, further including the step of updating the current map tree stored in said directory server to a new version by merging said current map tree and said temporary map tree, and wherein said network configuration data control means performs the steps of:

(E1) collecting, through said temporary map tree access means, information for those ones of the entries located under temporary map tree being merged, and that are designated as Delete, Modify or Add;

(E2) determining how many entries have been collected, wherein if it is determined that the number of entries collected is equal to zero, the process is ended, and if it is determined that the number of entries collected is equal to one or more, (E3) deleting, through said current map tree access means, the entry or entries designated as Delete from the current map tree;

(E4) modifying, through said current map tree access means, the entry or entries designated as Modify in said current map tree;

(E5) adding, through said current map tree access means, the entry or entries designated as Add to the current map tree; and (E6) when the merge processing for all of the entries designated as Delete, Modify and Add under the temporary map tree has been completed, writing the completion time into an appropriate temporary map entry through said temporary map tree access means.

7. In a system comprising a network configuration information management apparatus, the network configuration information management apparatus including:

(a) a directory server for storing a current map tree that contains information for current network configuration conditions organized into a directory tree structure and a temporary map tree that contains future configuration information, organization into a directory tree structure, that represents a difference from the current network configuration resulting from any changes made to the current network configuration;

(b) network configuration data control means for providing the network configuration data management functions by performing operations on map data in response to a request from any external application;

(c) current map tree access means for accessing the current map tree stored in said directory server to retrieve the information therefrom, and updating the retrieved information; and (d) a temporary map tree access means for accessing the temporary map tree stored in said directory server, and generating, modifying and updating the information therein, a network configuration data management method comprising the steps of:

(A1) receiving, at said network configuration data control means, a request for modifying configuration data from any external application, said network configuration data control means responding to the request to request that the temporary map tree access means generate a temporary map entry as a root for the temporary map tree, and said temporary map tree access means responding to the request from said network configuration data control means to access said directory server for generating the temporary map entry;

(A2) sorting data instructed in the request, termed as "request data", for modifying the configuration data for each entry, in the order of the directory tree hierarchy beginning with a top level toward a bottom level;

(A3) retrieving said sorted data in the request sequentially, and checking them to determine whether what is requested is to add, modify, or delete an entry;

(A4) dividing processing steps into add, modify and delete, based on the results of the checking, (A5) if it is determined that an entry is to be added, generating an entry designated as Add in the temporary map tree;

(A6) if it is determined that any existing entry is to be modified, generating an entry designated as Modify in the temporary map tree; and (A7) if it is determined that the information for any existing entry is to be deleted, generating an entry designated as Delete in the temporary map tree;

wherein said network configuration data management method further including the step of updating the current map tree stored in said directory server to a new version by merging said current map tree said temporary map tree, and wherein said network configuration data control means performs the steps of:

(E1) collecting, through said temporary map tree access means, information for those ones of the entries located under temporary map tree being merged, and that are designated as Delete, Modify or Add;

(E2) determining how many entries have been collected, wherein if it is determined that the number of entries collected is equal to zero, the process is ended, and if it is determined that the number of entries collected is equal to one or more, (E3) deleting, through said current map tree access means, the entry or entries designated as Delete from the current map tree;

(E4) modifying, through said current map tree access means, the entry or entries designated as Modify in said current map tree;

(E5) adding, through said current map tree access means, the entry or entries designated as Add to the current map tree; and (E6) when the merge processing for all of the entries designated as Delete, Modify and Add under the temporary map tree has been completed, writing the completion time into an appropriate temporary map entry through said temporary map tree access means; and wherein when it is determined that one or more entries located under the temporary map tree are to be deleted, the step (E3) further including causing said network configuration data control means to perform the steps of:

extracting the identifier for the appropriate entry from the information for the entry designated as Delete under the temporary map tree and collected through said temporary map tree access means;

translating the extracted identifier into an identifier for the corresponding entry designated as Delete under the current map tree;

deleting, through said current map tree access means, the entry under the current map tree by using the translated identifier as a parameter; and repeating the preceding steps until there are no more entries that are to be deleted.

8. In a system comprising a network configuration information management apparatus, the network configuration information management apparatus including:

(a) a directory server for storing a current map tree that contains information for current network configuration conditions organized into a directory tree structure and a temporary map tree that contains future configuration information, organized into a directory tree structure, that represents a difference from the current network configuration resulting from any changes made to the current network configuration;

(b) network configuration data control means for providing the network configuration data management functions by performing operations on map data in response to a request from any external application;

(c) current map tree access means for accessing the current map tree stored in said directory server to retrieve the information therefrom, and updating the retrieved information; and (d) a temporary map tree access means for accessing the temporary map tree stored in said directory server, and generating, modifying and updating the information therein, a network configuration data management method comprising the steps of:

(A1) receiving, at said network configuration data control means, a request for modifying configuration data from any external application, said network configuration data control means responding to the request to request that the temporary map tree access means generate a temporary map entry as a root for the temporary map tree, and said temporary map tree access means responding to the request from said network configuration data control means to access said directory server for generating the temporary map entry;

(A2) sorting data instructed in the request, termed as "request data", for modifying the configuration data for each entry, in the order of the directory tree hierarchy beginning with a top level toward a bottom level;

(A3) retrieving said sorted data in the request sequentially, and checking them to determine whether what is requested is to add, modify, or delete an entry;

(A4) dividing processing steps into add, modify and delete, based on the results of the checking, (A5) if it is determined that an entry is to be added, generating an entry designated as Add in the temporary map tree;

(A6) if it is determined that any existing entry is to be modified, generating an entry designated as Modify in the temporary map tree; and (A7) if it is determined that the information for any existing entry is to be deleted, generating an entry designated as Delete in the temporary map tree;

wherein said network configuration data management method further including the step of updating the current map tree stored in said directory server to a new version by merging said current map tree and said temporary map tree, and wherein said network configuration data control means performs the steps of:

(E1) collecting, through said temporary map tree access means, information for those ones of the entries located under temporary map tree being merged, and that are designated as Delete, Modify or Add;

(E2) determining how many entries have been collected wherein if it is determined that the number of entries collected is equal to zero, the process is ended, and if it is determined that the number of entries collected is equal to one or more, (E3) deleting, through said current map tree access means, the entry or entries designated as Delete from the current map tree;

(E4) modifying, through said current map tree access means, the entry or entries designated as Modify in said current map tree;

(E5) adding, through said current map tree access means, the entry or entries designated as Add to the current map tree; and (E6) when the merge processing for all of the entries designated as Delete, Modify and Add under the temporary map tree has been completed, writing the completion time into an appropriate temporary map entry through said temporary map tree access means; and wherein when it is determined that one or more entries located under the temporary map tree are to be modified, the step (E4) further including causing said network configuration data control means to perform the steps of:

extracting an identifier for the appropriate entry from the information for the entry designated as Modify under the temporary map tree and collected through said temporary map tree access means;

translating the extracted identifier into an identifier for the corresponding entry designated as Modify under the current map tree;

generating a parameter that specifies that the entry is to be modified;

modifying, through said current map tree access means, the entry located under the current map tree by using the translated identifier as a parameter; and repeating the preceding steps until there are no more entries that are to be modified.

9. In a system comprising a network configuration information management apparatus, the network configuration information management apparatus including:

(a) a directory server for storing a current map tree that contains information for current network configuration conditions organized into a directory tree structure and a temporary map tree that contains future configuration information, organized into a directory tree structure, that represents a difference from the current network configuration resulting from any changes made to the current network configuration;

(b) network configuration data control means for providing the network configuration data management functions by performing operations on map data in response to a request from any external application;

(c) current map tree access means for accessing the current map tree stored in said directory server to retrieve the information therefrom, and updating the retrieved information; and (d) a temporary map tree access means for accessing the temporary map tree stored in said directory server, and generating, modifying and updating the information therein, a network configuration data management method comprising the steps of:

(A1) receiving, at said network configuration data control means, a request for modifying configuration data from any external application, said network configuration data control means responding to the request to request that the temporary map tree access means generate a temporary map entry as a root for the temporary map tree, and said temporary map tree access means responding to the request from said network configuration data control means to access said directory server for generating the temporary map entry;

(A2) sorting data instructed in the request, termed as "request data", for modifying the configuration data for each entry, in the order of the directory tree hierarchy beginning with a top level toward a bottom level;

(A3) retrieving said sorted data in the request sequentially, and checking them to determine whether what is requested is to add, modify, or delete an entry;

(A4) dividing processing steps into add, modify and delete, based on the results of the checking, (A5) if it is determined that an entry is to be added, generating an entry designated as Add in the temporary map tree;

(A6) if it is determined that any existing entry is to be modified, generating an entry designated as Modify in the temporary map tree; and (A7) if it is determined that the information for any existing entry is to be deleted, generating an entry designated as Delete in the temporary map tree;

wherein said network configuration data management method further including the step of updating the current map tree stored in said directory server to a new version by merging said current map tree and said temporary map tree, and wherein said network configuration data control means performs the steps of:

(E1) collecting, through said temporary map tree access means, information for those ones of the entries located under temporary map tree being merged, and that are designated as Delete, Modify or Add;

(E2) determining how many entries have been collected wherein if it is determined that the number of entries collected is equal to zero, the process is ended, and if it is determined that the number of entries collected is equal to one or more, (E3) deleting, through said current map tree access means, the entry or entries designated as Delete from the current map tree;

(E4) modifying, through said current map tree access means, the entry or entries designated as Modify in said current map tree;

(E5) adding, through said current map tree access means, the entry or entries designated as Add to the current map tree; and (E6) when the merge processing for all of the entries designated as Delete, Modify and Add under the temporary map tree has been completed, writing the completion time into an appropriate temporary map entry through said temporary map tree access means; and wherein when it is determined that one or more entries located under the temporary map tree are to be added, the step (E5) further including causing said network configuration data control means to perform the steps of:

extracting the identifier for the appropriate entry from the information for the entry designated as Add under the temporary map tree and collected through said temporary map tree access means;

translating the extracted identifier into an identifier for a corresponding entry designated as Add under the current map tree;

generating a parameter that specifies that the entry is to be added;

adding, through said current map tree access means, the entry under the current map tree by using the translated identifier as a parameter; and repeating the preceding steps until there are no more entries that are to be added.

10. The network configuration data management method as defined in claim 2, wherein said network configuration information management apparatus further includes a network configuration data store section for storing the directory tree information temporarily, and wherein the method further includes a step of causing said network configuration data control means to perform the steps of:

retrieving, through said current map tree access means, information for a component as specified by the entry under the current map tree and containing the current network configuration information;

storing the retrieved information for said network configuration data store section temporarily;

searching for information for appropriate entries under the current map tree applicable to any particular time earlier than a time specified by said external application;

if it is determined that the number of temporary map entries collected is equal to zero, which means that the information obtained from the entries under the current map tree may be used, returning that information to said external application as it remains unchanged;

if it is determined that the number of temporary map entries collected is equal to one or more, collecting the information for each of the entries under the temporary map tree as specified by said external application and retrieved through said temporary map tree access means;

merging the collected entry information under the temporary map tree together with the current map tree previously stored in said network configuration data store section;

merging all of the temporary map entries collected to update the information under the current map tree stored in the network configuration data store section; and returning the updated information to said external application.

11. In a system comprising a network configuration information management apparatus, the network configuration information management apparatus including:
(a) a directory server for storing a current map tree that contains information for current network configuration conditions organized into a directory tree structure and a temporary map tree that contains future configuration information, organized into a directory tree structure, that represents a difference from the current network configuration resulting from any changes made to the current network configuration;
(b) network configuration data control means for providing the network configuration data management functions by performing operations on map data in response to a request from any external application;
(c) current map tree access means for accessing the current map tree stored in said directory server to retrieve the information therefrom, and updating the retrieved information; and
(d) a temporary map tree access means for accessing the temporary map tree stored in said directory server, and generating, modifying and updating the information therein, a network configuration data management method comprising the steps of:
(A1) receiving, at said network configuration data control means, a request for modifying configuration data from any external application, said network configuration data control means responding to the request to request that the temporary map tree access means generate a temporary map entry as a root for the temporary map tree; and said temporary map tree access means responding to the request from said network configuration data control means to access said directory server for generating the temporary map entry;
(A2) sorting data instructed in the request, termed as "request data", for modifying the configuration data for each entry, in the order of the directory tree hierarchy beginning with a top level toward a bottom level;
(A3) retrieving said sorted data in the request sequentially, and checking them to determine whether what is requested is to add, modify, or delete an entry;
(A4) dividing processing steps into add, modify and delete, based on the results of the checking,
(A5) if it is determined that an entry is to be added, generating an entry designated as Add in the temporary map tree;
(A6) if it is determined that any existing entry is to be modified, generating an entry designated as Modify in the temporary map tree; and
(A7) if it is determined that the information for any existing entry is to be deleted, generating an entry designated as Delete in the temporary map tree;
wherein
said directory server further includes a log map tree for storing log information for components that occurred in the past; and
said network configuration information management apparatus further includes a log map tree access means through which it has access to said log, map tree, and wherein
in response to the request for the network configuration information that is applicable to any particular lime in the past, said network configuration data control means obtains the information in the current map tree stored in said directory server as well as the information in said log map tree, through said current map tree access means and said log map tree access means, respectively, and then produces a new version of the network configuration information as requested by merging the information in said map tree together with the information in said log map tree that has been setup up to said particular past time;
and wherein if there are one or more entries under the temporary map tree that are to be deleted at the time when the entries under the current map tree are being deleted, the method further includes the step of causing said network configuration data control means to perform the steps of:
extracting an identifier for an appropriate entry from the information for the entry designated as Delete under the temporary map tree and collected through said temporary map tree access means;
translating the retrieved entry identifier into an identifier for the corresponding entry designated as Delete under the current map tree;
generating an entry designated as Added under the log map through said log map tree access means;
deleting the entry under the current map tree through said current map tree access means by using the translated identifier as a parameter; and
repeating the preceding steps until there are no more entries that are to be deleted.

12. In a system comprising a network configuration information management apparatus, the network configuration information management apparatus including:
(a) a directory server for storing a current map tree that contains information for current network configuration conditions organized into a directory tree structure and a temporary map tree that contains future configuration information, organized into a directory tree structure, that represents a difference from the current network configuration resulting from any changes made to the current network configuration;
(b) network configuration data control means for providing the network configuration data management functions by performing operations on map data in response to a request from any external application;
(c) current map tree access means for accessing the current map tree stored in said directory server to retrieve the information therefrom, and updating the retrieved information; and
(d) a temporary map tree access means for accessing the temporary map tree stored in said directory server, and generating, modifying and updating the information therein, a network configuration data management method comprising the steps of:
(A1) receiving, at said network configuration data control means, a request for modifying configuration data from any external application, said network configuration data control means responding to the request to request that the temporary map tree access means generate a temporary map entry as a root for the temporary map tree; and said temporary map tree access means responding to the request from said network configuration data control means to access said directory server for generating the temporary map entry;
(A2) sorting data instructed in the request, termed as "request data", for modifying the configuration data for each entry in the order of the directory tree hierarchy beginning with a top level toward a bottom level;

(A3) retrieving said sorted data in the request sequentially, and checking them to determine whether what is requested is to add, modify or delete an entry;

(A4) dividing processing steps into add, modify and delete, based on the requests of the checking, (A5) if it is determined that an entry is to be added, generating an entry designated as Add in the temporary map tree;

(A6) if it is determined that any existing entry is to be modified, generating an entry designated as Modify in the temporary map tree; and (A7) if it is determined that the information for any existing entry is to be deleted, generating an entry designated as Delete in the temporary map tree;

wherein said directory server further includes a log map tree for storing log information for components that occurred in the past; and said network configuration information management apparatus further includes a log map tree access means through which it has access to said log map tree, and wherein in response to the request for the network configuration information that is applicable to any particular time in the past, said network configuration data control means obtains the information in the current map tree stored in said directory server as well as the information in said log map tree, through said current map tree access means and said log map tree access means, respectively, and then produces a new version of the network configuration information as requested by merging the information in said map tree together with the information in said log map tree that has been setup up to said particular past time;

wherein if there are one or more entries under the temporary map tree that are to be modified at the time when the entries under the current map tree are being modified, the method further includes a step of causing said network configuration data control means to perform the steps of:

extracting an identifier for an appropriate entry from the information for entry designated as Modify under the temporary map tree and collected through said temporary map tree access means;

translating the retrieved entry identifier into an identifier for a corresponding entry designated as Modify under the current map tree;

generating a parameter that specifies that the entry is to be modified;

generating an entry designated as Modify under the log map through said log map tree access means;

modifying the entry under the current map tree through said current map tree access means by using the translated identifier as a parameter; and repeating the preceding steps until there are no more entries that are to be modified.

13. In a system comprising a network configuration information management apparatus, the network configuration information management apparatus including:

(a) a directory server for storing a current map tree that contains information for current network configuration conditions organized into a directory tree structure and a temporary map tree that contains future configuration information, organized into a directory tree structure, that represents a difference from the current network configuration resulting from any changes made to the current network configuration;

(b) network configuration data control means for providing the network configuration data management functions by performing operations on map data in response to a request from any external application;

(c) current map tree access means for accessing the current map tree stored in said directory server to retrieve the information therefrom, and updating the retrieved information; and (d) a temporary map tree access means for accessing the temporary map tree stored in said directory server, and generating, modifying and updating the information therein, a network configuration data management method comprising the steps of:

(A1) receiving, at said network configuration data control means, a request for modifying configuration data from any external application, said network configuration data control means responding to the request to request that the temporary map tree access means generate a temporary map entry as a root for the temporary map tree, and said temporary map tree access means responding to the request from said network configuration data control means to access said directory server for generating the temporary map entry;

(A2) sorting data instructed in the request, termed as "request data", for modifying the configuration data for each entry, in the order of the directory tree hierarchy beginning with a top level toward a bottom level;

(A3) retrieving said sorted data in the request sequentially, and checking them to determine whether what is requested is to add, modify, or delete an entry;

(A4) dividing processing steps into add, modify and delete, based on the results of the checking, (A5) if it is determined that an entry is to be added, generating an entry designated as Add in the temporary map tree;

(A6) if it is determined that any existing entry is to be modified, generating an entry designated as Modify in the temporary map tree; and (A7) if it is determined that the information for any existing entry is to be deleted, generating an entry designated as Delete in the temporary map tree;

wherein said directory server further includes a log map tree for storing log information for components that occurred in the past; and said network configuration information management apparatus further includes a log map tree access means through which it has access to said log map tree, and wherein in response to the request for the network configuration information that is applicable to any particular time in the past, said network configuration data control means obtains the information in the current map tree stored in said directory server as well as the information in said log map tree, through said current map tree access means and said log map tree access means, respectively, and then produces a new version of the network configuration information as requested by merging the information in said map tree together with the information in said log map tree that has been setup up to said particular past time;

wherein if there are one or more entries under the temporary map tree that are to be added at the time when the entries under the current map tree are being added, the method further includes the step of causing said network configuration data control means to perform the steps of:

extracting the identifier for the appropriate entry from the information for the entry designated as Add under the temporary map tree and collected through said temporary map tree access means;

translating the extracted identifier into an identifier for a corresponding entry designated as Add under the current map tree;

generating a parameter that specifies that the entry is to be added;

generating an entry designated as Add under the log map through said log map tree access means;

modifying the entry under the current map tree through said current map tree access means by using the translated identifier as a parameter; and repeating the preceding steps until there are no more entries that are to be added.

14. The network configuration data management method as defined in claim 12, further including the step of causing said network configuration data control means to perform the steps of:

retrieving, through said current map tree access means, the information or attribute value for the entry designated as Add or Modify from the corresponding entry in said current map tree;

extracting the identifier for the appropriate entry from the retrieved information, and translating the extracted identifier into the corresponding identifier under the log map tree;

checking a value for the type of operation;

if it is determined that the type of operation is "delete", setting the parameter for the entry designated as Add under the log map tree to specify "add" as the type of operation;

if it is determined that the type of operation is "modify", setting the type of operation for the entry being generated under the log map tree to "modify";

generating a parameter that specifies that an entry is to be generated under the log map tree, based on the attribute value collected from the entry under the current map tree; and generating the entry in said log map tree within said directory server through said log map tree access means.

15. The network configuration data management method as defined in claim 12, further including a step of causing said network configuration data control means to perform the steps of:

extracting an identifier from the information obtained from the entry designated as Add under the temporary map tree;

translating the extracted identifier into a corresponding identifier for use in generating an entry designated as Delete under the log map tree;

setting the parameter for the entry being generated under the log map tree to specify "delete" as the type of operation; and generating an entry designated as Delete under said log map tree through said log map tree access means.

16. A computer program for being executed on a computer including a network configuration information management apparatus that comprises:

a directory server storing:
a current map tree that contains information for the current network condition organized into a directory tree structure, and
a temporary map tree that contains information for the future network configuration, organized into a directory tree structure, that represents a difference from a current network configuration resulting from changes made to the current network configuration;

a network configuration data control means responsive to a request received from any external application for performing operations on the map data and providing network configuration data management functions;

a current map tree access means for retrieving and updating the information from the current map tree stored in said directory server; and a temporary map tree access means for performing the generating, modifying, and deleting operations for the temporary map tree stored in said directory server, the functional and processing features of said network configuration data control means, said computer program comprising the steps of:

(A1) receiving a request for change in the configuration from an external application, and requesting that the temporary map tree access means access said directory server to generate a temporary map entry as a root of the temporary map tree;

(A2) sorting the data instructed in the configuration change request, in the order of the directory tree hierarchy beginning with a top level toward a bottom level;

(A3) retrieving the sorted data in the request sequentially, and determining from the retrieved data that it requests that an entry is to be added, modified, or deleted;

(A4) based on the result determined in step (A3), dividing the processing steps into Add, Modify and Delete, otherwise treating the request as an error;

(A5) if it is determined that Add is requested, generating an entry designated as Add in the temporary map tree;

(A6) if it is determined that Modify is requested, generating an entry designated as Modify in the temporary map tree; and (A7) if it is determined that Delete is requested, generating an entry designated as Delete in the temporary map tree;

wherein said directory server further includes a log map tree for storing log information for components that occurred in the past;

wherein said network configuration information management apparatus further includes a log map tree access means through which it has access to said log map tree, and wherein, in response to the request for the network configuration information that is applicable to any particular time in the past, said network configuration data control means obtains the information in the current map tree stored in said directory server and the information in said log map tree through said current map tree access means and said lop map tree access means, respectively, and obtains the network configuration information as requested by merging the information in said map tree together with the information in said log map tree that has been setup up to said particular past time.

17. The computer program as defined in claim 16, wherein the step of generating an entry designated as Add in the temporary map tree includes the steps of:

(B1) extracting an identifier that indicates the location of entry in said directory tree from the identifier contained in the retrieved data;

(B2) checking the retrieved identifier to determine whether a parent entry for the entry designated as Add in said temporary map tree has already been generated;

(B3) if it is determined that the parent entry has not already been generated, causing said network configuration data control means to retrieve, through said current map tree access means, the parent entry information contained in said current map tree;

(B4) generating a parent entry under the temporary map entry through said temporary map tree access means, wherein as the parent entry already exists in said current map tree, requiring no modification, said temporary map tree access means sets the attribute value for the type of operation for the parent entry in the directory class under the map to "Not Applicable" to indicate that the adding process should be bypassed when said temporary map tree is merged together with said current map tree; and (B5) generating an additional entry designated as Add and contained in the data in the request, under the parent entry generated through said temporary map tree access means, wherein said temporary map tree access means sets an attribute value for the type of operation in the directory class under the map to "Add" to indicate that an appropriate additional entry is to be added in the current map tree when said temporary map tree as merged together with said current map tree.

18. The computer program as defined in claim 16, wherein the step of generating an entry designated as Modify in the temporary map tree includes the steps of:

(C1) extracting an identifier that indicates the location of entry in said directory tree from identifiers contained in the retrieved request data;

(C2) checking the extracted identifier to determine whether a parent entry for the entry designated as Add in said temporary map tree has already been generated;

(C3) if it is determined that the parent entry has not already been generated, causing said network configuration data control means to retrieve, through said current map tree access means, the parent entry information contained in said current map tree; (C4) generating a parent entry under the temporary map entry through said temporary map tree access means, wherein as the parent entry already exists in said current map tree, requiring no modification, said temporary map tree access means sets an attribute value for the type of operation for the parent entry in the directory class under the map to "Not Applicable" to indicate that the modifying process should be bypassed when said temporary map tree is merged together with said current map tree; and (C5) generating an entry designated as Modify and contained in the data in the request, under the parent entry generated through said temporary map tree access means, wherein said temporary map tree access means sets the attribute value for the type of operation in the directory class under the map tree to "Modify" to indicate that an appropriate entry located in the current map tree as to be modified when said temporary map tree as merged together with said current map tree.

19. The computer program as defined in claim 16, wherein the step of generating an entry designated as Delete in the temporary map tree includes the steps of:

(D1) extracting an identifier that indicates the location of entry in said directory tree from the identifiers contained in the retrieved request data;

(D2) checking the extracted identifier to determine whether the parent entry for the entry designated as Delete in said temporary map tree has already been generated;

(D3) if it is determined that the parent entry has not already been generated, causing said network configuration data control means to retrieve, through said current map tree access means, the parent entry information contained in said current map tree;

(D4) generating a parent entry under the temporary map entry through said temporary map tree access means, wherein as the parent entry already exists in said current map tree, requiring no modification, said temporary map tree access means sets the attribute value for the type of operation for the parent entry in the directory class under the map to "Not Applicable" to indicate that the deleting process should be bypassed when said temporary map tree as merged together with said current map tree; and (D5) generating an entry designated as Delete and contained in the data in the request, under the parent entry generated through said temporary map tree access means, wherein said temporary map tree access means sets an attribute value for the type of operation in the directory class under the map to "Delete" to indicate that the appropriate entry located in the current map tree as to be deleted when said temporary map tree as merged with said current map tree.

20. The computer program as defined in claim 16, wherein further including the step of updating the current map tree stored in said directory server to a new version by merging said current map tree and said temporary map tree, and wherein said network configuration data control means performs the steps of:

(E1) collecting, through said temporary map tree access means, information for those ones of the entries located under temporary map tree being merged, and that are designated as Delete, Modify or Add;

(E2) determining how many entries have been collected, wherein if it is determined that the number of entries collected is equal to zero, the process is ended, and if it is determined that the number of entries collected is equal to one or more, (E3) deleting, through said current map tree access means, the entry designated as Delete from the current map tree;

(E4) modifying, through said current map tree access means, the entry designated as Modify in said current map tree;

(E5) adding, through said current map tree access means, the entry designated as Add to the current map tree; and (E6) when the merge processing for all of the entries designated as Delete, Modify and Add under the temporary map tree has been completed, writing the completion time into an appropriate temporary map entry through said temporary map tree access means.

21. A computer program for being executed on a computer including a network configuration information management apparatus that comprises:

a directory server storing:
  a current map tree that contains information for the current network condition organized into a directory tree structure, and
  a temporary map tree that contains information for the future network configuration, organized into a directory tree structure, that represents a difference from a current network configuration resulting from changes made to the current network configuration;
a network configuration data control means responsive to a request received from any external application for performing operations on the map data and providing network configuration data management functions;
a current map tree access means for retrieving and updating the information from the current map tree stored in said directory server; and
a temporary map tree access means for performing the generating, modifying, and deleting operations for the temporary map tree stored in said directory server, the functional and processing features of said network configuration data control means,
said computer program comprising the steps of:
(A1) receiving a request for change in the configuration from an external application, and requesting that the temporary map tree access means access said directory server to generate a temporary map entry as a root of the temporary map tree;
(A2) sorting the data instructed in the configuration change request, in the order of the directory tree hierarchy beginning with a top level toward a bottom level;
(A3) retrieving the sorted data in the request sequentially, and determining from the retrieved data that it requests that an entry is to be added, modified, or deleted;
(A4) based on the result determined in step (A3), dividing the processing steps into Add, Modify and Delete, otherwise treating the request as an error;
(A5) if it is determined that Add is requested, generating an entry designated as Add in the temporary map tree;
(A6) if it is determined that Modify is requested, generating an entry designated as Modify in the temporary map tree; and
(A7) if it is determined that Delete is requested, generating an entry designated as Delete in the temporary map tree; wherein when it is determined that there are one or more entries located under the temporary map tree that are to be deleted, the step (E3) further including causing said network configuration data control means to perform the steps of:
extracting the identifier for the appropriate entry from the information for the entry designated as Delete under the temporary map tree and collected through said temporary map tree access means;
translating the extracted identifier into an identifier for the corresponding entry designated as Delete under the current map tree;
deleting, through said current map tree access means, the entry under the current map tree by using the translated identifier as a parameter; and
repeating the preceding steps until there are no more entries that are to be deleted.

22. A computer program for being executed on a computer including a network configuration information management apparatus that comprises:

a directory server storing:
  a current map tree that contains information for the current network condition organized into a directory tree structure, and
  a temporary map tree that contains information for the future network configuration, organized into a directory tree structure, that represents a difference from a current network configuration resulting from chances made to the current network configuration;
a network configuration data control means responsive to a request received from any external application for performing operations on the map data and providing network configuration data management functions;
a current map tree access means for retrieving and updating the information from the current map tree stored in said directory server; and
a temporary map tree access means for performing the generating, modifying, and deleting operations for the temporary map tree stored in said directory server, the functional and processing features of said network configuration data control means,
said computer program comprising the steps of:
(A1) receiving a request for change in the configuration from an external application, and requesting that the temporary map tree access means access said directory server to generate a temporary map entry as a root of the temporary map tree;
(A2) sorting the data instructed in the configuration change request, in the order of the directory tree hierarchy beginning with a top level toward a bottom level;
(A3) retrieving the sorted data in the request sequentially, and determining from the retrieved data that it requests that an entry is to be added, modified, or deleted;
(A4) based on the result determined in step (A3), dividing the processing steps into Add, Modify and Delete, otherwise treating the request as an error;
(A5) if it is determined that Add is requested, generating an entry designated as Add in the temporary map tree;
(A6) if it is determined that Modify is requested, generating an entry designated as Modify in the temporary map tree; and
(A7) if it is determined that Delete is requested, generating an entry designated as Delete in the temporary map tree;
wherein when it is determined that there are one or more entries located under the temporary map tree that are to be modified, the step (E4) further including causing said network configuration data control means to perform the steps of:
extracting an identifier for the appropriate entry from the information for the entry designated as Modify under the temporary map tree and collected through said temporary map tree access means;
translating the retrieved identifier into an identifier for the corresponding entry designated as Modify under the current map tree;
generating a parameter that specifies that the entry is to be modified;
modifying, through said current map tree access means, the entry under the current map tree by using the translated identifier as a parameter; and
repeating the preceding steps until there are no more entries that are to be modified.

23. A computer program for being executed on a computer including a network configuration information management apparatus that comprises:
   a directory server storing:
      a current map tree that contains information for the current network condition organized into a directory tree structure, and
      a temporary map tree that contains information for the future network configuration, organized into a directory tree structure, that represents a difference from a current network configuration resulting from changes made to the current network configuration;
   a network configuration data control means responsive to a request received from any external application for performing operations on the map data and providing network configuration data management functions;
   a current map tree access means for retrieving and updating the information from the current map tree stored in said directory server; and
   a temporary map tree access means for performing the generating, modifying, and deleting operations for the temporary map tree stored in said directory server, the functional and processing features of said network configuration data control means,
   said computer program comprising the steps of:
   (A1) receiving a request for change in the configuration from an external application, and requesting that the temporary map tree access means access said directory server to generate a temporary map entry as a root of the temporary map tree;
   (A2) sorting the data instructed in the configuration change request, in the order of the directory tree hierarchy beginning with a top level toward a bottom level;
   (A3) retrieving the sorted data in the request sequentially, and determining from the retrieved data that it requests that an entry is to be added, modified, or deleted;
   (A4) based on the result determined in step (A3), dividing the processing steps into Add, Modify and Delete, otherwise treating the request as an error;
   (A5) if it is determined that Add is requested, generating an entry designated as Add in the temporary map tree;
   (A6) if it is determined that Modify is requested, generating an entry designated as Modify in the temporary map tree; and
   (A7) if it is determined that Delete is requested, generating an entry designated as Delete in the temporary map tree; wherein when it is determined that one or more entries located under the temporary map tree that are to be added, the step (E5) further including causing said network configuration data control means to perform the steps of:
   extracting the identifier for the appropriate entry from the information for the entry designated as Add under the temporary map tree and collected through said temporary map tree access means;
   translating the extracted identifier into an identifier for a corresponding entry designated as Add under the current map tree;
   generating a parameter that specifies that the entry is to be added;
   modifying, through said current map tree access means, the entry under the current map tree by using the translated identifier as a parameter; and
   repeating the preceding steps until there are no more entries that are to be added.

24. The computer program as defined in claim 16, wherein said network configuration information management apparatus further includes a network configuration data store section for storing the directory tree information temporarily, and wherein the computer program further includes a step of causing said network configuration data control means to perform the steps of:
   retrieving, through said current map tree access means, information for a component as specified by the entry under the current map entry and containing the current network configuration information;
   storing the retrieved information in said network configuration data store section temporarily;
   searching for information for appropriate temporary map entries that is applicable to any particular time earlier than a time specified by said external application;
   if it is determined that the number of temporary map entries collected is equal to zero, which means that the information under the current map entry that has been obtained may be returned to the external application, returning that information to said external application;
   if it is determined that the number of temporary map entries collected is equal to one or more, collecting the information for each of the entries under the temporary map entry as specified by said external application and obtained through said temporary map tree access means;
   merging the collected entry information under the temporary map entry together with the current map tree previously stored in said network configuration;
   merging all of the temporary map entries collected to update the information under the current map entries stored in the network configuration data store section; and
   returning the updated information to said external application.

25. A computer program for being executed on a computer including a network configuration information management apparatus that comprises:
   a directory server storing:
      a current map tree that contains information for the current network condition organized into a directory tree structure, and
      a temporary map tree that contains information for the future network configuration, organized into a directory tree structure, that represents a difference from a current network configuration resulting from changes made to the current network configuration;
   a network configuration data control means responsive to a request received from any external application for performing operations on the map data and providing network configuration data management functions;
   a current map tree access means for retrieving and updating the information from the current map tree stored in said directory server; and
   a temporary map tree access means for performing the generating, modifying, and deleting operations for the temporary map tree stored in said directory server, the functional and processing features of said network configuration data control means,
   said computer program comprising the steps of:
   (A1) receiving a request for change in the configuration from an external application, and requesting that the temporary map tree access means access said directory server to generate a temporary map entry as a root of the temporary map tree;

(A2) sorting the data instructed in the configuration change request, in the order of the directory tree hierarchy beginning with a top level toward a bottom level;

(A3) retrieving the sorted data in the request sequentially, and determining from the retrieved data that it requests that an entry is to be added, modified, or deleted;

(A4) based on the result determined in step (A3), dividing the processing steps into Add, Modify and Delete, otherwise treating the request as an error;

(A5) if it is determined that Add is requested, generating an entry designated as Add in the temporary map tree;

(A6) if it is determined that Modify is requested, generating an entry designated as Modify in the temporary map tree; and (A7) if it is determined that Delete is requested, generating an entry designated as Delete in the temporary map tree; wherein if there are one or more entries under the temporary map tree that are to be deleted at the time when the entries under the current map entry are being deleted, the computer program further includes a step of causing said network configuration data control means to perform the steps of:

extracting an identifier for an appropriate entry from the information for the entry designated as Delete under the temporary map tree and collected through said temporary map tree access means;

translating the extracted identifier into an identifier for the corresponding entry designated as Delete under the current map tree;

generating an entry designated as Add under the log map through said log map tree access means;

deleting the entry under the current map entry through said current map tree access means by using the translated identifier as a parameter; and repeating the preceding steps until there are no more entries that are to be deleted.

26. A computer program for being executed on a computer including a network configuration information management apparatus that comprises:

a directory server storing:
  a current map tree that contains information for the current network condition organized into a directory tree structure, and
  a temporary map tree that contains information for the future network configuration, organized into a directory tree structure, that represents a difference from a current network configuration resulting from changes made to the current network configuration;

a network configuration data control means responsive to a request received from any external application for performing operations on the map data and providing network configuration data management functions;

a current map tree access means for retrieving and updating the information from the current map tree stored in said directory server; and a temporary map tree access means for performing the generating, modifying, and deleting operations for the temporary map tree stored in said directory server, the functional and processing features of said network configuration data control means, said computer program comprising the steps of:

(A1) receiving a request for change in the configuration from an external application, and requesting that the temporary map tree access means access said directory server to generate a temporary map entry as a root of the temporary map tree;

(A2) sorting the data instructed in the configuration change request, in the order of the directory tree hierarchy beginning with a top level toward a bottom level;

(A3) retrieving the sorted data in the request sequentially, and determining from the retrieved data that it requests that an entry is to be added, modified, or deleted;

(A4) based on the result determined in step (A3), dividing the processing steps into Add, Modify and Delete, otherwise treating the request as an error;

(A5) if it is determined that Add is requested, generating an entry designated as Add in the temporary map tree;

(A6) if it is determined that Modify is requested, generating an entry designated as Modify in the temporary map tree; and (A7) if it is determined that Delete is requested, generating an entry designated as Delete in the temporary map tree; wherein if there are one or more entries under the temporary map tree that are to be modified at the time when the entries under the current map tree are being modified, the computer program further includes the step of causing said network configuration data control means to perform the steps of:

extracting the identifier for the appropriate entry from the information for the entry designated as Modify under the temporary map tree and collected through said temporary map tree access means;

translating the extracted identifier into an identifier for the corresponding entry designated as Modify under the current map tree;

generating a parameter that specifies that the entry is to be modified;

generating an entry designated as Modify under the log map through said log map tree access means;

modifying the entry under the current map entry through said current map tree access means by using the translated identifier as a parameter; and repeating the preceding steps until there are no more entries that are to be modified.

27. A computer program for being executed on a computer including a network configuration information management apparatus that comprises:

a directory server storing;
  a current map tree that contains information for the current network condition organized into a directory tree structure, and
  a temporary map tree that contains information for the future network configuration, organized into a directory tree structure, that represents a difference from a current network configuration resulting from changes made to the current network configuration;

a network configuration data control means responsive to a request received from any external application for performing operations on the map data and providing network configuration data management functions;

a current map tree access means for retrieving and updating the information from the current map tree stored in said directory server; and a temporary map tree access means for performing the generating, modifying, and deleting operations for the temporary map tree stored in said directory server, the functional and processing features of said network configuration data control means, said computer program comprising the steps of:

(A1) receiving a request for change in the configuration from an external application, and requesting that the temporary map tree access means access said directory server to generate a temporary map entry as a root of the temporary map tree;

(A2) sorting the data instructed in the configuration change request, in the order of the directory tree hierarchy beginning with a top level toward a bottom level;

(A3) retrieving the sorted data in the request sequentially, and determining from the retrieved data that it requests that an entry is to be added, modified, or deleted;

(A4) based on the result determined in step (A3), dividing the processing steps into Add, Modify and Delete, otherwise treating the request as an error;

(A5) if it is determined that Add is requested, generating an entry designated as Add in the temporary map tree;

(A6) if it is determined that Modify is requested, generating an entry designated as Modify in the temporary map tree; and (A7) if it is determined that Delete is requested, generating an entry designated as Delete in the temporary map tree; wherein if there are one or more entries under the temporary map tree that are to be added at the time when the entries under the current map tree are being added, the computer program further includes a step of causing said network configuration data control means to perform the steps of:

extracting an identifier for an appropriate entry from the information for the entry designated as Add under the temporary map tree and collected through said temporary map tree access means;

translating the extracted identifier into an identifier for the corresponding entry designated as Add under the current map tree;

generating a parameter that specifies that the entry is to be added;

generating an entry designated as Delete under the log map through said log map tree access means;

adding the entry under the current map tree through said current map tree access means by using the translated identifier as a parameter; and repeating the preceding steps until there are no more entries that are to be added.

28. A computer program for being executed on a computer including a network configuration information management apparatus that comprises:

a directory server storing:

a current map tree that contains information for the current network condition organized into a directory tree structure, and a temporary map tree that contains information for the future network configuration, organized into a directory tree structure, that represents a difference from a current network configuration resulting from changes made to the current network configuration;

a network configuration data control means responsive to a request received from any external application for performing operations on the map data and providing network configuration data management functions;

a current map tree access means for retrieving and updating the information from the current map tree stored in said directory server; and a temporary map tree access means for performing the generating, modifying, and deleting operations for the temporary map tree stored in said directory server, the functional and processing features of said network configuration data control means, said computer program comprising the steps of:

(A1) receiving a request for change in the configuration from an external application, and requesting that the temporary map tree access means access said directory server to generate a temporary map entry as a root of the temporary map tree;

(A2) sorting the data instructed in the configuration change request, in the order of the directory tree hierarchy beginning with a top level toward a bottom level;

(A3) retrieving the sorted data in the request sequentially, and determining from the retrieved data that it requests that an entry is to be added, modified, or deleted;

(A4) based on the result determined in step (A3), dividing the processing steps into Add, Modify and Delete, otherwise treating the request as an error;

(A5) if it is determined that Add is requested, generating an entry designated as Add in the temporary map tree;

(A6) if it is determined that Modify is requested, generating an entry designated as Modify in the temporary map tree; and (A7) if it is determined that Delete is requested, generating an entry designated as Delete in the temporary map tree;

causing said network configuration data control means to perform the steps of:

retrieving the information or attribute value for the entry designated as Add or Modify from the corresponding entry in said current map tree through said current map tree access means;

extracting an identifier for an appropriate entry from the retrieved information, and translating the extracted identifier into a corresponding identifier under the log map tree;

checking the value for the type of operation;

if it is determined that the type of operation is "delete", setting a parameter for the entry designated as Add under the log map tree to specify "add" as the type of operation;

if it is determined that the type of operation is "modify", setting the type of operation for the entry being generated under the log map tree to the value "modify";

generating a parameter for the entry being generated under the log map tree, based on an attribute value collected from the entry under the current map tree; and generating an entry in said log map tree within said directory server through said log map tree access means.

29. A computer program for being executed on a computer including a network configuration information management apparatus that comprises:

a directory server storing:

a current map tree that contains information for the current network condition organized into a directory tree structure, and a temporary map tree that contains information for the future network configuration, organized into a directory tree structure, that represents a difference from a current network configuration resulting from changes made to the current network configuration;

a network configuration data control means responsive to a request received from any external application for performing operations on the map data and providing network configuration data management functions;

a current map tree access means for retrieving and updating the information from the current map tree stored in said directory server; and a temporary map tree access means for performing the generating, modifying, and deleting operations for the temporary map tree stored in said directory server, the functional and processing features of said network configuration data control means, said computer program comprising the steps of:

(A1) receiving a request for chance in the configuration from an external application, and requesting that the temporary map tree access means access said directory server to generate a temporary map entry as a root of the temporary map tree;

(A2) sorting the data instructed in the configuration chance request, in the order of the directory tree hierarchy beginning with a top level toward a bottom level;

(A3) retrieving the sorted data in the request sequentially, and determining from the retrieved data that it requests that an entry is to be added, modified, or deleted;

(A4) based on the result determined in step (A3), dividing the processing steps into Add, Modify and Delete, otherwise treating the request as an error;

(A5) if it is determined that Add is requested, generating an entry designated as Add in the temporary map tree;

(A6) if it is determined that Modify is requested, generating an entry designated as Modify in the temporary map tree; and (A7) if it is determined that Delete is requested, generating an entry designated as Delete in the temporary map tree;

causing said network configuration data control means to perform the steps of:

extracting an identifier for an appropriate entry from the information obtained from the entry designated as Add under the temporary map tree;

translating the extracted identifier into a corresponding identifier for use in generating an entry designated as Delete under the log map tree;

setting the parameter for the entry being generated under the log map tree to specify "delete" as the type of operation; and generating an entry designated as Delete under said log map through said log map tree access means.

* * * * *